United States Patent
Li et al.

(10) Patent No.: US 12,284,630 B2
(45) Date of Patent: Apr. 22, 2025

(54) PAGING AND NETWORK SELECTION TECHNIQUES FOR WIRELESS COMMUNICATION

(71) Applicant: ZTE Corporation, Guangdong (CN)

(72) Inventors: Wenting Li, Shenzhen (CN); He Huang, Shenzhen (CN); Yuan Gao, Shenzhen (CN)

(73) Assignee: ZTE Corporation, Guangdong (CN)

( * ) Notice: Subject to any disclaimer, the term of this patent is extended or adjusted under 35 U.S.C. 154(b) by 416 days.

(21) Appl. No.: 17/889,616

(22) Filed: Aug. 17, 2022

(65) Prior Publication Data

US 2022/0417900 A1 Dec. 29, 2022

Related U.S. Application Data

(63) Continuation of application No. PCT/CN2020/076426, filed on Feb. 24, 2020.

(51) Int. Cl.
*H04W 68/02* (2009.01)
*H04W 48/08* (2009.01)

(52) U.S. Cl.
CPC ........... *H04W 68/02* (2013.01); *H04W 48/08* (2013.01)

(58) Field of Classification Search
CPC ... H04W 68/02; H04W 48/08; H04W 68/005; H04W 48/18
See application file for complete search history.

(56) References Cited

U.S. PATENT DOCUMENTS

| | | | |
|---|---|---|---|
| 2018/0124687 A1 | 5/2018 | Park et al. | |
| 2019/0223086 A1 | 7/2019 | Jung et al. | |
| 2019/0223145 A1 | 7/2019 | Jung et al. | |
| 2019/0223147 A1* | 7/2019 | Chen | H04W 68/02 |
| 2019/0357131 A1* | 11/2019 | Sivavakeesar | H04W 76/15 |
| 2021/0099972 A1* | 4/2021 | Lee | H04W 76/27 |
| 2022/0116908 A1* | 4/2022 | Chun | H04W 76/27 |
| 2024/0340853 A1* | 10/2024 | Park | H04L 5/0048 |

FOREIGN PATENT DOCUMENTS

| | | |
|---|---|---|
| CN | 101389066 A | 3/2009 |
| WO | 2020032849 A1 | 2/2020 |
| WO | 2020037086 A1 | 2/2020 |

OTHER PUBLICATIONS

Office Action for Chinese Patent Application No. 202080082600.0, mailed Apr. 21, 2023, with English summary (16 pages).

(Continued)

*Primary Examiner* — Charles N Appiah
*Assistant Examiner* — Frank E Donado
(74) *Attorney, Agent, or Firm* — Perkins Coie LLP

(57) ABSTRACT

Techniques are described for paging techniques. For example, a wireless communication method comprises transmitting, by a network node to a communication node, multiple sets of paging configuration information, where each set of paging configuration information includes a service type information that describes a type of network service, and where each set of paging configuration information includes one or more paging related information.

14 Claims, 24 Drawing Sheets

(56) References Cited

OTHER PUBLICATIONS

3GPP, "3rd Generation Partnership Project; Technical Specification Group Radio Access Network; NR; Radio Resource Control (RRC) protocol specification," 3GPP TS 38.331 V15.8.0 (Dec. 2019).
Office Action for Japanese Patent Application No. 2022-549868, mailed Jun. 9, 2023, with English summary (5 pages).
Huawei et al., "Further Discussion on Slice Information over RRC," 3GPP TSG RAN WG2 #AH-1807, Montreal, Canada, R2-1809971, 4 pages, Jul. 2-6, 2018.
Huawei et al., "System Information Update Notification," 3GPP TSG RAN WG2 #93, St. Julian's, Malta, R2-161381, 4 pages, Feb. 15-19, 2016.
Ericsson, "Correction to UE specific DRX cycle," 3GPP TSG RAN #104, Spokane, USA, R2-1817157, 3 pages, Nov. 12-16, 2018.
Ericsson, "Submission for information on Commonalities in solutions for Non-Public Network deployments," 3GPP TSG RAN WG2 #106, Reno, USA, R2-1907313, 10 pages, May 13-17, 2019.
LG Electronics Inc., "Paging in Nb-IoT," 3GPP TSG RAN WG2 #91bis, Malmö, Sweden, R2-154877, 2 pages, Oct. 5-9, 2015.
International Search Report and Written Opinion for International Application No. PCT/CN2020/076426, mailed on Dec. 1, 2020 (8 pages).
Extended Search Report for European Patent Application No. 20888304.1, mailed Jan. 5, 2023 (10 pages).
CMCC, "Motivation for new SI: Study on enhancement of RAN slicing," 3GPP TSG RAN Meeting #86, RP-192601, Stiges, Barcelona, Dec. 9-12, 2019 (8 pages).
NEC, "Slice Impacts on Mobility: Further considerations," 3GPP TSG-RAN WG3 Meeting #Ad-hoc, R3-170138, Spokane, Washington, USA, Jan. 17-19, 2017 (2 pages).

* cited by examiner

FIG. 8

|   | octet 1 | octet 2 | octet 3 | ... | octet i | octet i+1* | ... | octet l* | octet l+1* | ... | octet m* | octet m+1* | ... | octet n* |
|---|---|---|---|---|---|---|---|---|---|---|---|---|---|---|
| 1 | PF and PO location list IEI | Length of PF location list contents | PF location 1 | | | PO location1 | | | PF location 2 | | | | | |
| 2 | | | | | | | | | | | | | | |
| 3 | | | | | | | | | | | | | | |
| 4 | | | | | | | | | | | | | | |
| 5 | | | | | | PF location 2 | | | PO location2 | | | ... | | |
| 6 | | | | | | | | | | | | | | |
| 7 | | | | | | | | | | | | | | |
| 8 | | | | | | | | | | | | | | |

Transmitting, by a network node to a communication node, cell access related information that includes a selection capability indication configured to indicate whether the communication node is enabled to select a non-public network (NPN) that the communication node is not authorized to select automatically

PAGING AND NETWORK SELECTION TECHNIQUES FOR WIRELESS COMMUNICATION

CROSS REFERENCE TO RELATED APPLICATIONS

This patent document is a continuation of and claims benefit of priority to International Patent Application No. PCT/CN2020/076426, filed on Feb. 24, 2020. The entire content of the before-mentioned patent application is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

Techniques are disclosed for paging and network selection techniques.

A first example wireless communication method comprises transmitting, by a network node to a communication node, multiple sets of paging configuration information, where each set of paging configuration information includes a service type information that describes a type of network service, and where each set of paging configuration information includes one or more paging related information.

A second example wireless communication method comprises receiving, by a communication node, multiple sets of paging configuration information, where each set of paging configuration information includes a service type information that describes a type of network service, and where each set of paging configuration information includes one or more paging related information.

A third example wireless communication method comprises receiving, by a network node from a core network, multiple sets of paging configuration information, where each set of paging configuration information includes a service type information that describes a type of network service, and where each set of paging configuration information includes one or more paging related information; and determining a set of paging configuration information to be used by a communication node from the multiple sets of paging configuration.

A fourth example wireless communication method comprises transmitting, by a network node to a core network, multiple sets of paging configuration information, where each set of paging configuration information includes a service type information that describes a type of network service, and where each set of paging configuration information includes one or more paging related information; and receiving, from the core network, an indication of a set of paging configuration information to be used from the multiple sets of paging configuration.

A fifth example wireless communication method comprises receiving, by a core network node from a network node, a number of total paging frames in a paging cycle and a number of paging occasions per paging frame; receiving, by the core network from a communication node, a request to reallocate a mobile subscriber identity of the communication node, where the request includes a reallocation assistance information that includes: a first value based on an identifier of the communication node and the number of total paging frames in the paging cycle, and a second value based on the identifier of the communication node, the number of total paging frames in the paging cycle, and the number of paging occasions per paging frame; and determining, for the communication node, the mobile subscriber identity that satisfies a criterion based at least on any one or more of the number of total paging frames in the paging cycle, the number of paging occasions per paging frame, the first value, and the second value.

A sixth example wireless communication method comprises determining, by a communication node, a paging frame offset to be used in response to the communication node being in an idle state, where the paging frame offset is based on a system frame number (SFN), a first paging cycle in the idle state (Tidle), and a pre-determined value, where a paging message is received according to the paging frame offset in response to the communication node in an inactive state having a second paging cycle that is same as the first paging cycle of the communication node in the idle state.

A seventh example wireless communication method comprises determining, by a communication node, a first paging frame offset to be used in an inactive state, where the first paging frame offset is based at least on a system frame number (SFN), a paging cycle in the inactive state (Tinactive), a first pre-determined value, and a second pre-determined value, and where a paging message is received according to the first paging frame offset in response to the communication node being in the inactive state.

An eighth example wireless communication method comprises transmitting, by a network node to a communication node, cell access related information that includes a selection capability indication configured to indicate whether the communication node is enabled to select a non-public network (NPN) that the communication node is not authorized to select automatically.

A ninth example wireless communication method comprises receiving, by an Non-Access Stratum (NAS) layer of a communication node, cell access related information that includes a selection capability indication configured to indicate whether the communication node is enabled to select a non-public network (NPN) that the communication node is not authorized to select automatically; and determining, by the NAS layer, whether to perform the selection of the type of network based on the selection capability indication.

In yet another exemplary aspect, the above-described methods are embodied in the form of processor-executable code and stored in a non-transitory computer-readable storage medium. The code included in the computer readable storage medium when executed by a processor, causes the processor to implement the methods described in this patent document.

In yet another exemplary embodiment, a device that is configured or operable to perform the above-described methods is disclosed.

The above and other aspects and their implementations are described in greater detail in the drawings, the descriptions, and the claims.

BRIEF DESCRIPTION OF THE DRAWING

FIG. 8 shows an example layer 3 coding of PF location information list.

FIG. 9 shows an example layer3 coding of PF and PO location information list.

FIG. 14H shows an exemplary flowchart for transmitting a selection capability indication for selection of a Non-Public Network (NPN).

DETAILED DESCRIPTION

Figure 1:
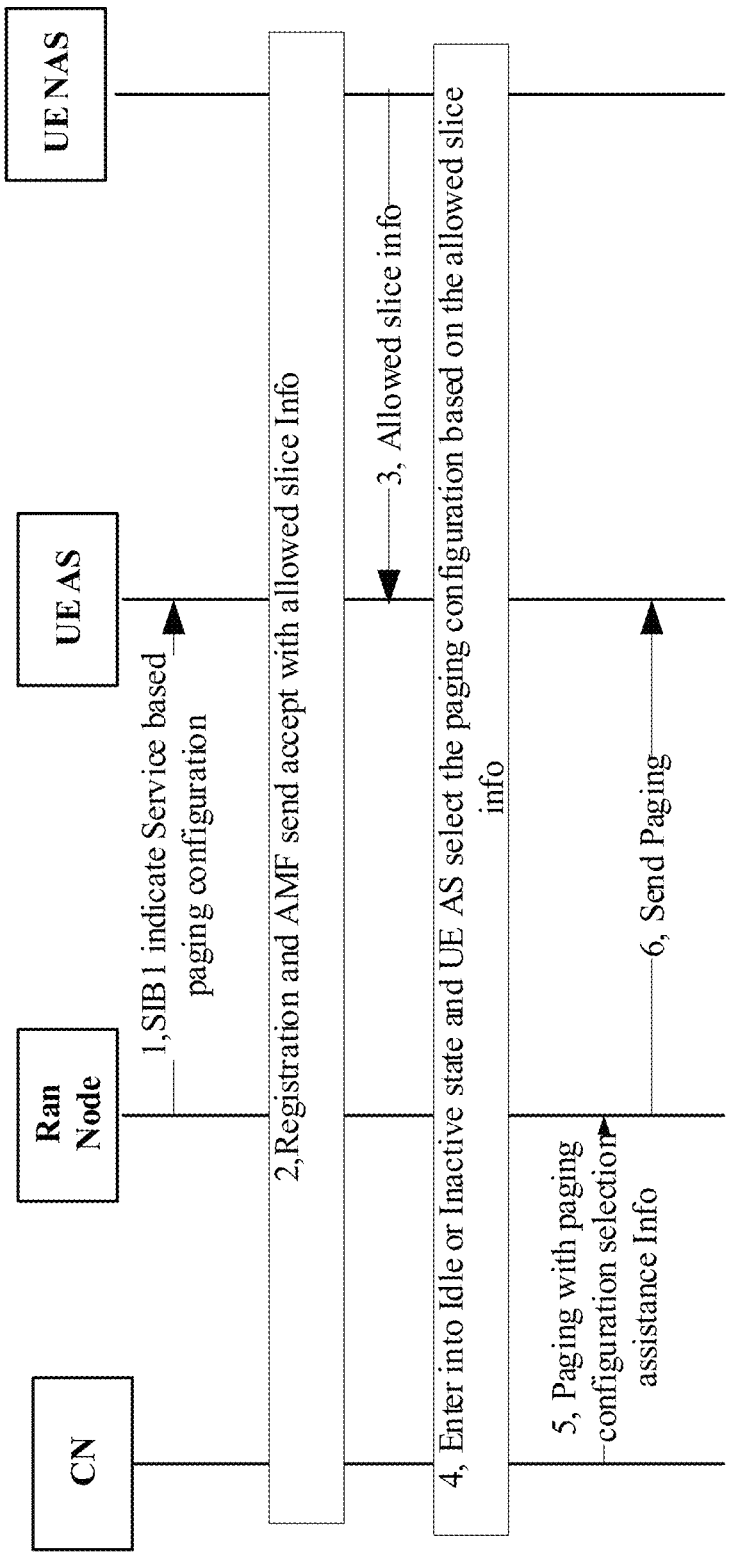
FIG. 1 shows an example of a service-based paging procedure.

This patent document describes paging techniques in three sections. Section I describes paging techniques for multiple paging configuration, Section II describes paging techniques for mitigating paging collision for multiple Subscriber Identity Module (SIM) scenario, and Section III describes techniques that enable selection of a Non-Public Network (NPN). The example headings for the various sections below are used to facilitate the understanding of the disclosed subject matter and do not limit the scope of the claimed subject matter in any way. Accordingly, one or more features of one example section can be combined with one or more features of another example section. Furthermore, 5G terminology is used for the sake of clarity of explanation, but the techniques disclosed in the present document are not limited to 5G technology only, and may be used in wireless systems that implemented other protocols.

I. Techniques for Multiple Paging Configuration

I.(a) Introduction

In the NR-R15/R16, the paging related parameters are configured per cell as follow:

| DownlinkConfigCommonSIB information element |
|---|
| -- ASN1START |
| -- TAG-DOWNLINKCONF |
| DownlinkConfigCommonSIB ::= SEQUENCE { |
|     frequencyInfoDL                 FrequencyInfoDL-SIB, |
|     initialDownlinkBWP           BWP-DownlinkCommon, |
|     bcch-Config                    BCCH-Config, |
|     pcch-Config                    PCCH-Config, |
|     ... |
| } |
| PCCH-Config ::=         SEQUENCE { |
|     defaultPagingCycle         PagingCycle, |
|     nAndPagingFrameOffset     CHOICE { |
|         oneT                    NULL, |
|         halfT                  INTEGER (0..1), |

-continued

| DownlinkConfigCommonSIB information element |
|---|
| ```
    quarterT              INTEGER (0..3),
    oneEighthT            INTEGER (0..7),
    oneSixteenthT         INTEGER (0..15)
  },
  ns                      ENUMERATED {four, two, one},
  firstPDCCH-MonitoringOccasionOfPO CHOICE {
    sCS15KHZoneT          SEQUENCE (SIZE (1..maxPO-perPF)) OF INTEGER (0..139),
    ....
  } OPTIONAL,     -- Need R
  ...
}
-- TAG-DOWNLINKCONFIGCOMMONSIB-STOP
-- ASN1STOP
``` |

The pagingsearchspace is also configured and transmitted in the system information block, where the pagingsearchspace can describe the search space of a physical downlink control channel (PDCCH) signal for paging the UE.

Recently, the slice enhancement and time sensitive network are being studied. For the different slice or service types, different Mobile Terminated (MT) delay are required. Currently, the paging cycle is defined per cell so that the network cannot set different paging cycle for the different service type, which may lead inaccessible delay for some time sensitive service.

Currently, the paging cycle is defined per cell so that the network cannot set different paging cycle for different service type, which may lead to inaccessible delay for some time sensitive service. For example, if one cell support ultra-reliable low-latency communication (URLLC) and enhanced mobile broadband (EMBB) service, the cell can have a higher delay requirements for the URLLC service, thus the shorter DRX cycle can be adopted then for the EMBB service. But in the current system information block (SIB), the paging cycle is configured per cell instead of the per service type.

Furthermore, a current technical problem is that different paging configuration are needed for different network identifiers (IDs) for network sharing for the public network and the private network.

I.(b). Example Technical Solutions for Multiple Paging Configuration

This patent document describes example paging techniques so that the UE can receive multiple paging configurations from the network (NW) and/or select the preferred paging configuration based on the service type.

FIG. 1 shows an example of a service-based paging procedure.

At Step 1: The RAN node configures and transmits the paging configuration for the one or more slices (e.g., service types). In the paging configuration, the related slice information are also included.

At Step 2: UE send Registration request to the core network (e.g., Access and Mobility Management Function (AMF)), the core network accept the request and sends, to the UE's NAS layer, the registration accept message with the allowed slice information. The allowed slice Information can include one or more slices, where each slice is indexed by a Single Network Slice Selection Assistance Information (S-NSSAI).

At Step 3: The UE NAS layer indicates one or more allowed slices to the UE's AS layer.

At Step 4: UE enter into Idle or Inactive state, and the UE's AS layer may select the paging configuration based on the one or more allowed slice information.

In some embodiments, Step 4 may not be performed after Step 3. For example, the AS layer can inform part or all of the paging configuration information to the NAS, then NAS layer indicate the NAS layer's preferred paging configuration to the AS layer so that the AS layer can perform paging related operations (e.g., determining paging occasions and/or paging frames) based on the preferred paging configuration indicated by the NAS layer. Thus, for example, if the UE enters Idle or Inactive state, the UE NAS selects the paging configuration based on the preferred configuration.

Step 5: the CN indicate the paging information to the RAN node, similar to the Steps 3 to 4 described above in this section. In Step 5, the CN can indicate the allowed slice information to the RAN node, and RAN node further determines the paging configuration, or the RAN indicate part or all of the paging configuration information to the CN during the Ng Setup procedure, then the CN indicate the CN's preferred paging configuration to the RAN when a paging is scheduled.

The UE and Network side (e.g., core network) can use the same paging configuration selection criterion to select a paging configuration from the multiple paging configurations.

I.(b).i. Technique 1: Description of the Multiple Paging Configurations and the UE's Reception of the Multiple Paging Configurations The network (e.g., RAN node) configures and transmit multiple paging configurations in the SIB or the dedicated radio resource control (RRC) signal. In this example, the SIB can be an example signaling in which multiple paging control channel (PCCH) configuration are transmitted e.g., a "PCCH-ConfigList" as shown below in bold italicized text. In the example PCCH-ConfigList, one or more PCCH configuration are included. For each PCCH configuration, the related slice information is also included (e.g., a list of S-NSSAI), where each S-NSSAI value can be associated with a network service type (e.g., URLLC, EMBB, etc.,). In some embodiments, only a part of the S-NSSAI can be included, such as a slice/service type (SST) (e.g., 8 bit value) that can indicate a type of slice or service (e.g., URLLC or EMBB), and optionally a slice differentiator (SD) (e.g., 32 bit value) that can differentiate among multiple network slices.

| DownlinkConfigCommonSIB information element |
|---|
| ```
-- ASN1START
-- TAG-NDOWNLINKCONFIGCOMMONSIB-START
DownlinkConfigCommonSIB ::= SEQUENCE {
    frequencyInfoDL          FrequencyInfoDL-SIB,
    initialDownlinkBWP          BWP-DownlinkCommon,
    bcch-Config              BCCH-Config,
    pcch-Config              PCCH-Config,
    ...,
    [[pcch-ConfigList        PCCH-ConfigListOPTIONAL,]]
}
PCCH-ConfigList ::=          SEQUENCE(SIZE (1..maxNrofS-NSSAI))OF PCCHConfig-r17
PCCH-Config-r17 ::=          SEQUENCE {
    s-NSSAI-List             SEQUENCE(SIZE (1..maxNrofS-NSSAI))OF S-NSSAI
    defaultPagingCycle          PagingCycle,
    nAndPagingFrameOffset          CHOICE {
        oneT             NULL,
        halfT            INTEGER (0..1),
        quarterT         INTEGER (0..3),
        oneEighthT         INTEGER (0..7),
        oneSixteenthT      INTEGER (0..15)
    },
    ns                 ENUMERATED {four, two, one},
    firstPDCCH-MonitoringOccasionOfPO CHOICE {
        sCS15KHZoneT          SEQUENCE (SIZE (1..maxPO-perPF)) OF INTEGER (0..139),
        ....
    } OPTIONAL,       -- Need R
    ...
}
S-NSSAI ::=          CHOICE{
    sst              BIT STRING (SIZE (8)),
    sst-SD           BIT STRING (SIZE (32))
}
-- TAG-DOWNLINKCONFIGCOMMONSIB-STOP
-- ASN1STOP
``` |

Figure 2:
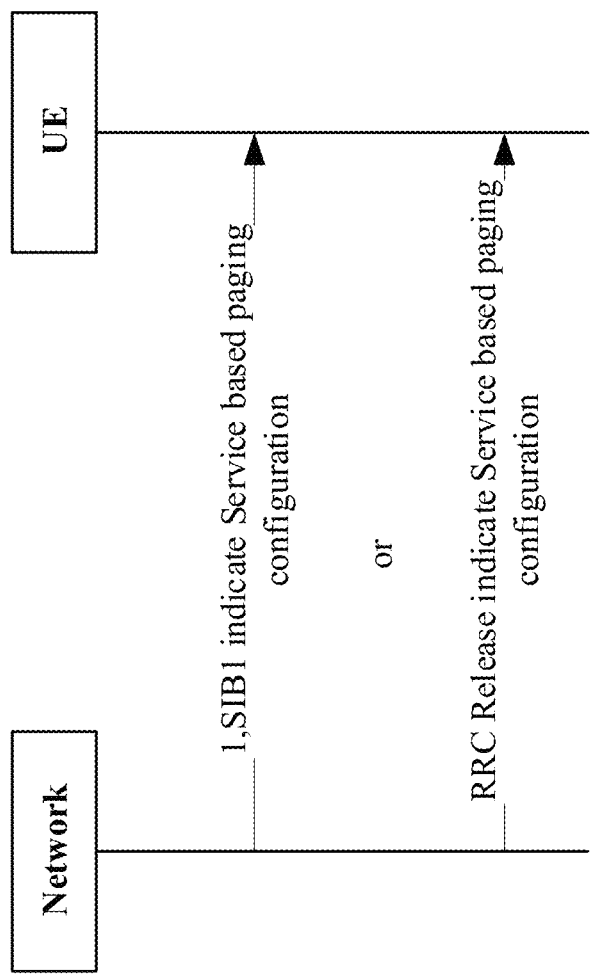
FIG. 2 shows an example transmission of multiple paging configurations from a network (e.g., Radio Access Network (RAN) node) to a user equipment (UE).

FIG. 2 shows an example transmission of multiple paging configurations from a network (e.g., RAN node) to the UE. The multiple paging configurations as described in Section I can be transmitted in the SIB or a dedicated RRC signal.

Two example SIBs are shown below to include multiple paging configurations configured based on different types of network service. In the first example, the network can configure different PCCH configuration parameters for each PCCH configuration, where one or more of the PCCH configuration parameters (e.g defaultPagingCycle, nAndPagingFrameOffset, ns and so on) may be different for each PCCH configuration. In the second example, compared with the first one, only the PCCH configuration parameters that is/are different (e.g., paging cycle) may be indicated.

| First Example DownlinkConfigCommonSIB information element |
|---|
| ```
-- ASN1START
-- TAG-NDOWNLINKCONFIGCOMMONSIB-START
DownlinkConfigCommonSIB ::= SEQUENCE {
    frequencyInfoDL          FrequencyInfoDL-SIB,
    initialDownlinkBWP          BWP-DownlinkCommon,
    bcch-Config              BCCH-Config,
    pcch-Config              PCCH-Config,
    ...,
    [[pcch-ConfigList        PCCH-ConfigListOPTIONAL,]]
}
PCCH-ConfigList ::=          SEQUENCE(SIZE (1..maxNrofS-NSSAI))OF PCCH-Config-r17
PCCH-Config-r17 ::=          SEQUENCE {
    s-NSSAI-List             SEQUENCE(SIZE (1..maxNrofS-NSSAI))OF S-NSSAI
    defaultPagingCycle          PagingCycle,
    nAndPagingFrameOffset          CHOICE {
        oneT             NULL,
        halfT            INTEGER (0..1),
        quarterT         INTEGER (0..3),
        oneEighthT         INTEGER (0..7),
        oneSixteenthT      INTEGER (0..15)
    } OPTIONAL,
    ns                 ENUMERATED {four, two, one} OPTIONAL, firstPDCCH-MonitoringOccasionOfPO
    CHOICE {
        sCS15KHZoneT          SEQUENCE (SIZE (1..maxPO-perPF)) OF INTEGER (0..139),
        ....
    } OPTIONAL,       -- Need R
    ...
}
S-NSSAI ::=          CHOICE{
``` |

| First Example DownlinkConfigCommonSIB information element |
|---|
| sst            BIT STRING (SIZE (8)),<br>sst-SD       BIT STRING (SIZE (32))<br>}<br>-- TAG-DOWNLINKCONFIGCOMMONSIB-STOP<br>-- ASN1STOP |

| Second Example DownlinkConfigCommonSIB information element |
|---|
| -- ASN1START<br>-- TAG-NDOWNLINKCONFIGCOMMONSIB-START<br>DownlinkConfigCommonSIB ::= SEQUENCE {<br>  frequencyInfoDL       FrequencyInfoDL-SIB,<br>  initialDownlinkBWP    BWP-DownlinkCommon,<br>  bcch-Config            BCCH-Config,<br>  pcch-Config            PCCH-Config,<br>  ...,<br>  *[[pcch-ConfigList*        *PCCH-ConfigListOPTIONAL,]]*<br>}<br>*PCCH-ConfigList ::=*      *SEQUENCE(SIZE (1..maxNrofS-NSSAI))OF PCCH-Config-r17*<br>*PCCH-Config-r17 ::=*     *SEQUENCE {*<br>  *sst-List*             *SEQUENCE (SIZE(1..maxNrofS-NSSAI))OF S-NSSAI,*<br>  defaultPagingCycle     PagingCycle<br>  --Note: The other parameters are same as the legacy PCCH-Config,<br>}<br>S-NSSAI ::=            CHOICE{<br>  sst                 BIT STRING (SIZE (8)),<br>  sst-SD            BIT STRING (SIZE (32))<br>}<br>-- TAG-DOWNLINKCONFIGCOMMONSIB-STOP<br>-- ASN1STOP |

Figure 3:
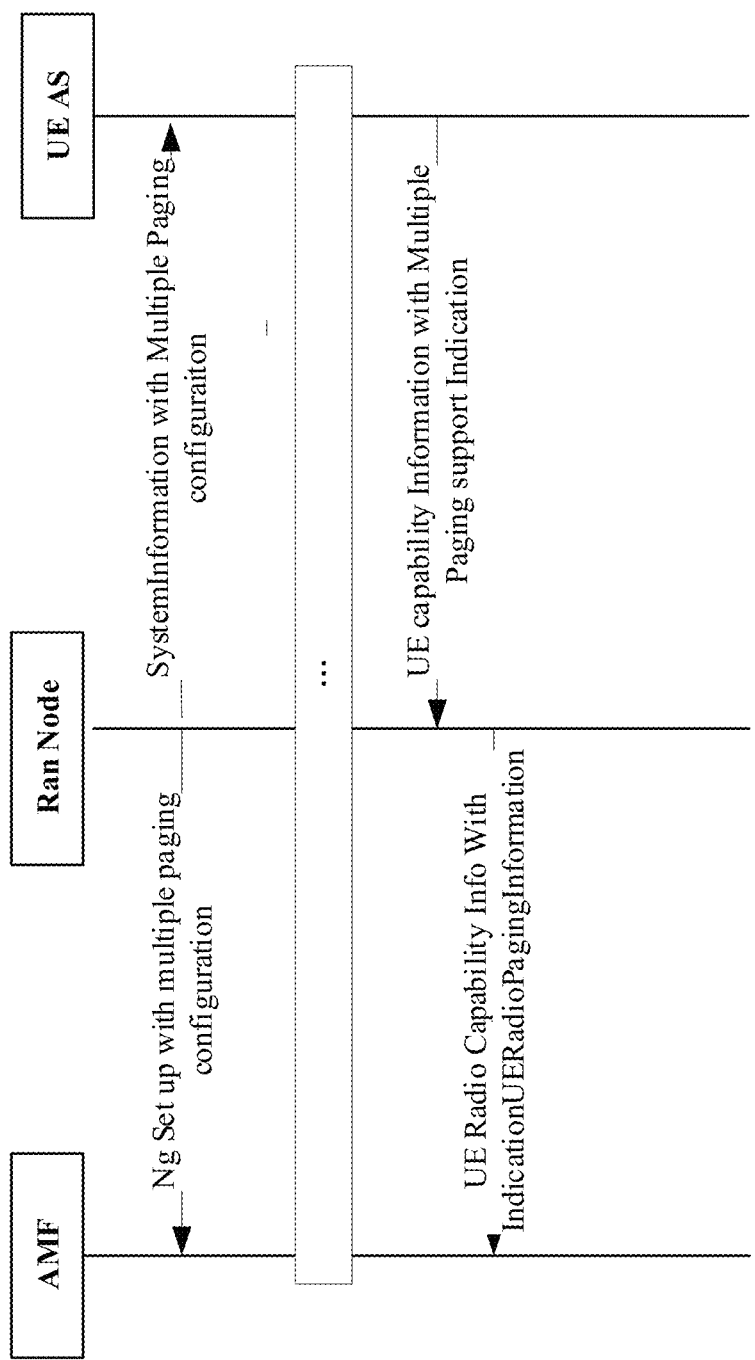
FIG. 3 shows an example flow diagram of a UE and/or RAN node reporting multiple paging configuration capability to a network.

I.(b).ii. Technique 2: The Network Determines the UE's and the RAN Node's Support of Multiple Paging Configuration FIG. 3 shows an example flow diagram of a UE and/or RAN node reporting multiple paging configuration capability to a network. In some embodiments, UE can indicate the multiple paging configuration capability to the network (e.g., the core network). For example, the UE can send to the RAN node or the Network an indication that the UE supports multiple paging configuration in, for example, the registration procedure or when the network requires information about the UE's capability. In some embodiments, the UE can include the multiple paging configuration capability in the UE capability information and send it to the RAN node. The RAN node, after receiving the UE capability information, can indicate the UE multiple paging configuration capability in the UERadioPagingInformation (as shown in FIG. 3) or in the UERadioAccessCapabilityInformation. In some other embodiments, the UE can include the multiple paging configuration capability as a Non-Access Stratum (NAS) layer capability in a NAS message (e.g., registration request message).

For the RAN side, during the next generation control plane interface (NG-C) or Si interface setup, the RAN node can indicate the RAN node's capability on supporting multiple paging configuration to the core network via, e.g., the NG setup message as shown in FIG. 3. In some embodiments, after the RAN node sends an indication of its support of multiple paging configuration to the CN for CN to determine paging scheme, e.g., when paging is coming or scheduled, the core network can include the allowed slice information in the Paging Msg to the RAN node. In some embodiments, the RAN node sends part of the multiple PCCH configurations to the CN for CN to determine paging scheme, e.g., when paging is coming or scheduled, the core network can include preferred PCCH configuration in the Paging Msg to the RAN node.

I.(b).iii. Technique 3: Selection of the Paging Configuration from the Multiple Paging Configurations at Both UE and Network Side, and Interaction Between the RAN Node and CN, and Interaction Between the UE NAS and AS The UE and network side can use the same paging configuration selection criterion to select a paging configuration based on one or more allowed slices associated within one or more paging configuration from the multiple paging configuration indicated to the UE by the RAN node or by the network, where each paging configuration can be associated with one or more S-NSSAI identifiers. For example, the UE and network can select the paging configuration based on the allowed slice information. Specifically, and as an example, the UE and the network choose the PCCH configuration with the shortest DRX cycle according to the allowed slices.

Interaction between the RAN and CN: In some embodiments, the CN can indicate the allowed slice information to the RAN node, and where the RAN node further determines the paging configuration to use from the multiple paging configuration information based on the allowed slice information. In some other embodiments, the RAN node can indicate part or all of the paging configuration information to the CN during the Ng Setup procedure, then the CN indicate the CN's selected paging configuration to the RAN in the initial context setup response message (Rsp Msg) or in the paging message when a paging is scheduled. The CN can indicate a selected paging configuration using, for example, a PCCH configuration index.

Interaction between the UE AS layer and UE NAS layer: In some embodiments, the UE's NAS layer can indicate the allowed slices to the UE's AS layer, and AS determine the final PCCH configuration. In some embodiments, the AS layer of the UE can inform part or all of the paging configuration information to the UE's NAS layer, then the NAS layer can indicate the NAS layer's selected configuration to the AS layer so that the communication node can perform paging related operations based on the selected configuration.

I.(b).iii.(A) Example of Paging Configuration Selection Criterion

In the SIB, the multiple PCCH configuration or multiple paging configuration can be listed as follow (shown in bold italicized text):

| DownlinkConfigCommonSIB information element |
|---|
| -- ASN1START |
| -- TAG-NDOWNLINKCONFIGCOMMONSIB-START |
| DownlinkConfigCommonSIB ::= SEQUENCE { |
|    frequencyInfoDL     FrequencyInfoDL-SIB, |
|    initialDownlinkBWP   BWP-DownlinkCommon, |
|    bcch-Config         BCCH-Config, |
|    pcch-Config         PCCH-Config, |
|    ..., |
|    *[[pcch-ConfigList    PCCH-ConfigListOPTIONAL,]]* |
| } |
| *PCCH-ConfigList[0] ::=  { S-NSSAI = 1 and S-NSSAI = 2,defaultPaging Cycle = rf64}* |
| *PCCH-ConfigList[1] ::=  { S-NSSAI = 3 and S-NSSAI = 4,defaultPaging Cycle = rf128}* |
| -- TAG-DOWNLINKCONFIGCOMMONSIB-STOP |
| -- ASN1STOP |

If, in the registration accept Msg sent by CN to the UE, the allowed slices include S-NSSAI=2 and S-NSSAI=4, then the UE can select PCCH-ConfigList[0] with paging cycle=64 radio frames.

I.(b).iii.(B) Interaction Between the RAN and CN

The CN indicate the paging information to the RAN node, the CN can indicate the one or more allowed slice information to the RAN. The RAN node can further determine the paging configuration, or the RAN indicate part or all of the paging configuration information to the NAS during the Ng Setup procedure via (e.g., the NG Setup message), then the CN indicate the CN's selected paging configuration (e.g., via a PCCH configuration index) to the RAN when a paging is scheduled.

Figure 4A:
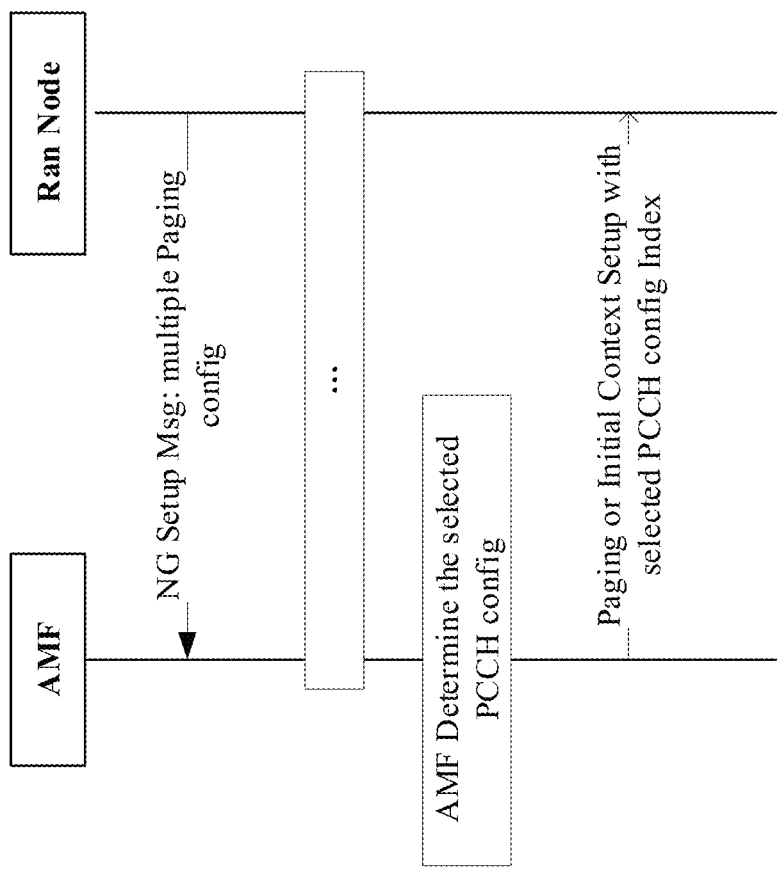
FIG. 4A shows a first example of a core network selecting a paging control channel (PCCH) configuration from the multiple paging configurations.

FIG. 4A shows a first example of a core network selecting a PCCH configuration from the multiple paging configurations and indicating the selected PCCH configuration to the RAN node. At Step 1: the RAN indicate part or all of the paging configuration information to the NAS during the Ng Setup procedure. At Step 2: the CN indicate the CN's selected paging configuration to the RAN in the initial context setup (Rsp Msg) or in the paging Msg when a paging is scheduled.

Figure 4B:
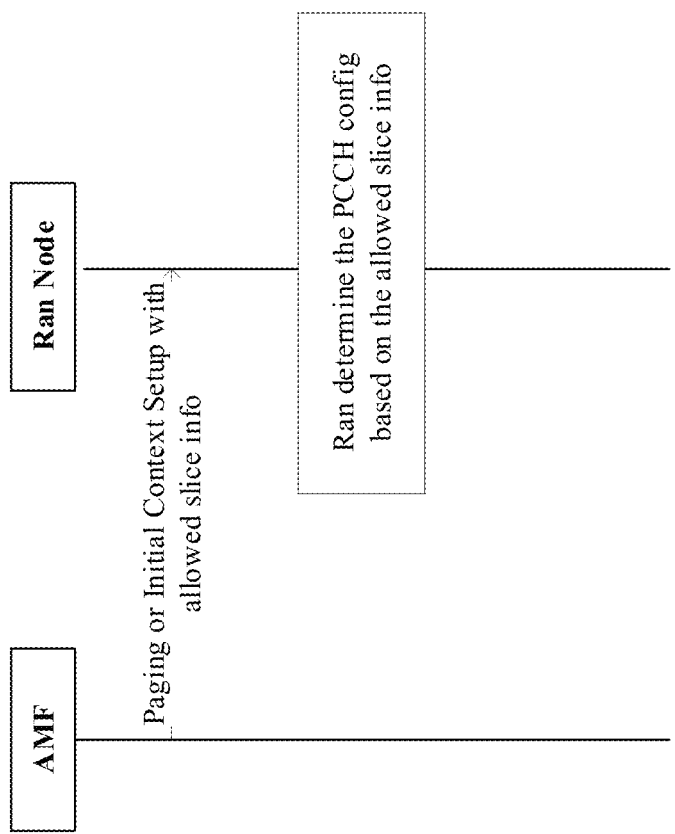
FIG. 4B shows a second example of a core network indicating one or more allowed slices to the RAN node.

FIG. 4B shows a second example of a core network indicating one or more allowed slices to the RAN node for the RAN node to select a PCCH configuration from the one or more paging configurations associated with the one or more allowed slices. At Step 1: the CN indicate the paging information to the RAN node, the CN can indicate the allowed slice information to the RAN. At Step 2: RAN further determine the paging configuration

I.(b).iii.(C) Interaction Between the UE AS Layer and UE NAS Layer

The SIB example shown below includes multiple paging configuration information (indicated in bold italicized text):

| DownlinkConfigCommonSIB information element |
|---|
| -- ASN1START |
| -- TAG-NDOWNLINKCONFIGCOMMONSIB-START |
| DownlinkConfigCommonSIB ::= SEQUENCE { |
|    frequencyInfoDL     FrequencyInfoDL-SIB, |
|    initialDownlinkBWP   BWP-DownlinkCommon, |
|    bcch-Config         BCCH-Config, |
|    pcch-Config         PCCH-Config, |
|    ..., |
|    *[[pcch-ConfigList    PCCH-ConfigListOPTIONAL,]]* |
| } |
| *PCCH-ConfigList[0] ::=  { S-NSSAI = 1 andS-NSSAI = 2,defaultPaging Cycle = rf64}* |
| *PCCH-ConfigList[1] ::=  { S-NSSAI = 3 andS-NSSAI = 4,defaultPaging Cycle = rf128}* |
| -- TAG-DOWNLINKCONFIGCOMMONSIB-STOP |
| -- ASN1STOP |

If, in the SIB example above, a CN sends to a UE a registration accept Msg that indicates that the allowed slices includes S-NSSAI=2 and S-NSSAI=4, then the UE may select the PCCH configuration using example Options A and B discussed below.

Option A:
   Step 1: AS layer of the UE indicate the following information to NAS layer of the UE:
   PCCH-ConfigList[0]::={S-NSSAI=1 and S-NSSAI=2, defaultPagingCycle=rf64}
   PCCH-ConfigList[1]::={S-NSSAI=3 and S-NSSAI=4, defaultPagingCycle=rf128}
   Step 2: NAS indicate PCCH-ConfigList[0] to the AS, and AS detect paging based on PCCH-ConfigList[0]

Option B:
   Step 1: NAS layer of the UE indicate the slice 2 and slice 4 to AS layer of the UE
   Step 2: AS layer of the UE selects PCCH-ConfigList[0]

I.(c). Example Configuration Methods

For the multiple paging configuration, besides the PCCH configuration or the paging cycle in the above examples, there are also many other configuration methods as shown below:

- A: Different search space—Different search space may determine the time domain information for a PDCCH of paging. For each paging configuration, different paging search spaces can be configured and such configuration information can be transmitted by e.g., RAN node to the UE in downlink control information (DCI) via PDCCH.
- B: Different control resource set (CORESET)—The CORESET may determine the frequency domain information for the PDCCH of paging. For each paging configuration, different control resource sets can be configured and such configuration information can be transmitted by e.g., RAN node to the UE in DCI via PDCCH.
- C: Different bandwidth—For each paging configuration, different bandwidth can be configured and such configuration information can be transmitted by e.g., RAN node to the UE. For example, for paging configuarion1, the bandwidth can be 5 MHz, and for paging configuarion2, the bandwidth can be 10 MHz.
- D: Different locations on the frequency domain—For each paging configuration, different frequency ranges can be configured and such configuration information can be transmitted by e.g., RAN node to the UE. For example, paging configuration) can be located from frequency 1 to frequency 2, and paging configuration2 can be located from frequency 3 to frequency 4.
- E: Different transmitting method such as different repetition times or different beam switch scheme—For each paging configuration, different repetition modes or beam switch schemes can be configured and such configuration information can be transmitted by e.g., RAN node to the UE. For example, paging configuration1 can be repeated N times in a paging offset (PO) and paging configuration2 can be repeated M times in a PO, where M and N may be integers greater than or equal to 1.
- F: Different Reference signal—Synchronization Signal Block (SSB) can be used as reference signal or Channel State Information Reference Signal (CSI-RS) can be used as reference signal. For each paging configuration, different reference signals can be configured and such configuration information can be transmitted by e.g., RAN node to the UE. For example, for paging configuration 1, the paging is quasi-co-located (QCLed) with SSB and paging configuration 2 is QCLwith CSI-RS
- G: Different Radio Network Temporary Identity (RNTI)—For each paging configuration, different RNTI values can be configured and such configuration information can be transmitted by e.g., RAN node to the UE. In the current specification, only one P-RNTI is defined. This patent document, one or more more RNTIs can be defined for multiple paging configurations.
- H: Different Sub Carrier Spacing (SCS)—For each paging configuration, different SCS values can be configured and such configuration information can be transmitted by e.g., RAN node to the UE. For example, for paging configuration 1, SCS=15 kHZ and for paging configuration 2, SCS=30 khz.

In some embodiments, the network (e.g., RAN node) can combine one or more of the above-mentioned schemes together.

Furthermore, while the above description takes the service type as an example, the multiple paging configurations can also be configured based on the following variables:

- A: Network type, such as cell access group (CAG) or standalone Non-Public Network (SNPN) or PLMN—Different paging configurations can be adopted for the different network types, where the UE detects the paging based on the camped network type. For example, if a cell (e.g., operated by a RAN node) is shared by PLMN, SNPN and CAG together, there can be three paging configurations for the PLMN, SNPN, CAG respectively.
- B: Network ID, such as PLMN or Tracking Area Code (TAC) or CAG ID or SNPN ID: Different paging configurations can be adopted for the different Network IDs, such as such for PLMN or TAC or CAG ID or SNPN ID. The UE detects the paging based on the camped network ID
- C: Access category or Access class: Different paging configurations can be adopted for the Access category or Access class. The UE NAS can inform one or more Access category or Access class to the AS of the UE for the AS to further determine paging configuration.
- E: Different UE types, such as NR-Light UE—Different paging configurations can be adopted for the different UE types, where the UE detect the paging according to its type. For example, the eMBB UE, mMTC UE, URLLC UE and NR Light UE (configured to reduce the UE complexity) can adopt paging configuration 1 to configuration 4, respectively. In this example, the UE will determine the paging configuration according to a device type of the UE.
- F: Different paging cause/purpose, such as MT call or MT data or MT signaling. Different paging configurations can be adopted for the different paging cause/purpose. The UE can select one or more paging configuration based on the NAS indication, or detect all of the paging
- G: Different beams or the corresponding CSI-RS resources In some embodiments, the network can combine one or more of the above-mentioned schemes together.

Before receiving the paging Message, the UE may first decodes the DCI that scrambled with P-RNTI (the RNTI value used for Paging), then the UE further determine whether and how to decode the Paging message on the PDSCH according to the DCI information. To reduce the fake alarming of the UE (in scenarios where the UE receives and decodes the paging message, but the paging is not for this UE or the UE_ID, such as 5G-STMSI, not included in the paging message), some additional DCI information can be added into the PDCCH DCI of paging as shown below.

- A: CAG/SNPN ID or CAG/SNPN ID Index or Private network Type Indication—For example, in a scenario where a cell is shared by different CAG IDs and/or PLMNs, if the different paging configurations are adopted for different CAG IDs, in the DCI, the CAG ID index according to the SIB1 can be included in the DCI, then for the UE that camp on the this CAG ID, it can receive the paging message on the PDSCH, while for the UE not camp on this CAG ID, it can ignore or disregard this paging directly. Or, if, in the DCI, a CAG network type is indicated, then for the CAG UE, it can receive paging message on the PDSCH, while for the non-CAG UE, it can ignore or disregard this paging directly
- B: PLMN ID or PLMN ID index or TAC or TAC index—For example, in a scenario where a cell is shared by different PLMNs, with one or more TACs, in the DCI, the PLMN index and/or TAC index according to SIB1 can be indicated in the DCI, then the UE can determine whether to further decoding PDSCH based on its camped PLMN and/or TAC
- C: UE type such Enhanced Mobile Broadband (EMBB) UE, massive Machine-Type Communications (mMTC) UE or NR Light UE. For example, in the DCI, one or more Paged UE types can be included, for example, in a paging message, it includes UE IDs of EMBB UE and UE IDs of NR Light UE, then it can indicate EMBB and NR Light UE type in the DCI. Furthermore, if all of the UE types are included, no UE type indication is needed in the DCI or the corresponding field is absent. UE may further determine whether to decode the corresponding paging message on the PDSCH based on its device type.
- D: Transmission mode (e.g., repetition or not). For example, in the DCI, a network (e.g., RAN node) can include the repetition information of the transmission mode of the paging message.

According to information described above, the UE can further determine whether decoding the corresponding paging message on the PDSCH.

CSI-RS based paging configuration is further described below:

According to above description, for each paging configuration, different reference signals can be configured, and such configuration information can be transmitted by e.g., RAN node to the UE. For example, for paging configuration 1, the paging is quasi-co-located (QCLed) with Synchronization Signal Block (SSB) and paging configuration 2 is QCL with Channel State Information Reference Signal CSI-RS.

Specifically, and as an example, the UE may report a capability indication to the network in the paging capability, where the capability indication tells or informs the network whether this UE support CSI-RS based paging. The RAN node can get this capability indication from UE side or from the core network. The RAN node can select the paging configuration based on the capability indication. The following steps further describe an example of this technique:

Step 1: UE send CSI-RS based paging supporting indication in the capability information to the network during the registration procedure and the network accept this capability Step 2: UE get the CSI-RS based paging supporting indication or the CSI-RS based paging configuration in the system information.

Step 3: UE select CSI-RS based paging configuration to detect paging.

Step 4: If the UE move to a cell that not support the CSI-based paging, the UE will select SSB-based paging configuration to detect paging.

At RAN side, for a certain UE, if the CSI-RS based paging indication was included in the paging capability from the CN and the ran node support CSI-RS based paging, the RAN will send paging based on CSI-RS, otherwise send the paging on the SSB.

For the CSI-RS based paging, for each paging configuration, RAN node or network can map to one or more CSI-RS configurations or CSI-RS indexes. The mapping between the paging resource of each paging configuration and the CSI-RS can be configured explicitly by the system information or RRC signaling, or implicitly.

For the implicitly method, the UE and the network determine the mapping between the paging resources of each paging configuration and the CSI-RS according the same rule, and this rule can be specified in the specification (e.g., may be pre-defined). For example, the paging resource of the first paging configuration mapped to the first CSI-RS, the paging resource of the second paging configuration mapped to the second CSI-RS. In which the CSI-RS can belong to one or more cells.

The above method can be adopted in one or more cells. The network can configure the CSI-RS of one or more cells to the UE and a set of paging resources, the UE can map these paging resources to the CSI-RS of the different cells.

Some other method on SSB based paging configuration:
Similar to the CSI-RS, the network can also configure the SSB of one or more cells to the UE and a set of paging resources, the UE can map these paging resources to the SSBs of the different cells.

Other paging configuration determination methods are further described below.

In the above examples, different paging configurations are configured for different service type or UE capability/type or similar. At UE side, the UE may select the paging configuration based on a same criterion as the network side, such as based on the service type, UE capability/type (e.g., as described in Section I and in other embodiments in this patent document).

Another method is that the network may broadcast all of the paging resources together, then the UE or the network may determine the paging resources based on the total paging resource number (indicated as "N" for some embodiments). For example, the UE or the network can determine the paging resources by ID mod N, in which the ID can be pre-configured or specified, such as CAG ID or SNPN ID or PLMN ID or Access class or access category or Temp UE ID (such as 5G-STMSI) or other ID that indicated in the NAS signal.

The UE or the network can also combine this scheme with the techniques described in Section I or other embodiments described in this patent document.

Paging Sub-Channel Method:
In the current specification, the paging channel can be determined by the paging search space together with paging control resource set. Multiple paging configurations can also be implemented by multiple paging sub-channel. The paging sub-channel can be defined as subset of the resources of the paging channel. Then one paging configuration can be mapped to one or more paging sub channels. Besides, the frequency domain and time domain, the paging sub channel can also be defined from the Code domain aspect.

In a PF or PO or a paging cycle, one or more paging sub channel can be defined. The paging sub channel can be distributed in frequency domain, timing domain or the code domain. The paging sub channels can have the same or different paging cycle, the UE can also select it's preferred paging sub-channel to detect paging with the condition that the same selection criterion is adopted at both UE and network side.

Furthermore, the configurations for the paging sub channels or for the multiple paging configurations can include the following two parts:

Common configuration part: this part is shared by multiple paging sub channels or paging configurations, such as common P-RNTI, common SCS or common resources on time/frequency/code domain.

Dedicated configuration part: the dedicated configuration for a paging sub channel or for a certain paging configuration, such as dedicated P-RNTI, SCS or dedicated resources on time/frequency/code domain.

At the UE side, the UE determines the final paging configuration or paging sub channel based on both the common configuration part and dedicated part.

For the dedicated configuration part, it can be indicated explicitly or implicitly Explicitly: The configuration parameters for the paging sub-channel or for the paging configuration are indicated in the system information or RRC signaling explicitly Implicitly: The network side configure necessary parameters for UE to derive different paging sub-channel configuration or different paging configurations. The UE receive these parameters and further determine the dedicated paging configuration or the paging resources for the paging sub-channel. For example, the network can indicate the total number of the paging sub channels (note as X) in a paging cycle, for the Kth paging sub channel, it can contain all of the POs that satisfy K=(Y mod X) where Y is the Po index in one paging cycle.

The methods of multiple paging configuration including the multiple paging sub channel in this disclosure can also be extended to other common resources configuration, such as the resources configuration of system information, the resources for the broadcasting, or the resources for the multi-casting.

Taking the method of multiple paging sub channel configuration as an example, it can also be extended for the resource configuration of the system information, in the current specification, the time/frequency resources for the system information can be determined by the system information search space together with system information control resource set. The system information sub-channel can be defined as subset of these resources. For different service type or UE type, the network can transmit the related system information with different system information sub channel. At the UE side, the UE can determine which system information sub channel can be detected based on the its configuration, such as UE type, requested service type and so on. In this patent document, the term system information may include system information block (SIB).

Some examples are further described below:

Example 1: Besides the PCCH configuration or the Paging cycle in the above examples, there are also many other configuration methods Example 1.1: Configuration methods A: Different search space, which mainly determine the time domain information for the PDCCH(DCI) of paging. In the current system Information, the PDCCH configuration is as below. The pagingSearchSpace includes an ID of the search space for paging. If pagingSearchSpace field is absent, the UE may not receive paging in the bandwidth part (BWP) associated with the search space. The searchSpaceZero describes parameters of the common SearchSpace#0. The values for searchSpaceZero are interpreted like the corresponding bits in MIB pdcch-ConfigSIB 1. Even though the searchSpaceZero field is only configured in the initial BWP (BWP#0), searchSpaceZero can be used in search spaces configured in other DL BWP(s) than the initial DL BWP if certain conditions are satisfied.

| PDCCH-ConfigCommon information element |
| --- |
| ```
-- ASN1START
--TAG-PDCCH-CONFIGCOMMON-START
PDCCH-ConfigCommon ::=      SEQUENCE {
    controlResourceSetZero        ControlResourceSetZero    OPTIONAL, -- Cond InitialBWP-Only
    commonControlResourceSet      ControlResourceSet        OPTIONAL, -- Need R
    searchSpaceZero               SearchSpaceZero    OPTIONAL, -- Cond InitialBWP-Only
    searchSpaceSIB1               SearchSpaceId     OPTIONAL, -- Need S
    searchSpaceOtherSystemInformation SearchSpaceId         OPTIONAL, -- Need S
    pagingSearchSpace             SearchSpaceId  OPTIONAL, -- Need S
    ra-SearchSpace                SearchSpaceId     OPTIONAL, -- Need S
    ...,
}
-- TAG-PDCCH-CONFIGCOMMON-STOP
-- ASN1STOP
``` |

For the paging search space, if the "pagingSearchSpace" is absent, searchSpaceZero can be used. In other words, there can be only one paging search space. For the multiple paging configuration scheme, different paging search spaces can be configured based on different principles as described above and in this patent document, such as configure different paging search spaces for different network type or different UE type and so on. Then the asn.1 coding could be as shown below in bold italicized text.

```
PDCCH-ConfigCommon ::=        SEQUENCE {
   controlResourceSetZero           ControlResourceSetZero OPTIONAL, -- Cond InitialBWP-Only
   commonControlResourceSet         ControlResourceSet     OPTIONAL, -- Need R
   searchSpaceZero                  SearchSpaceZero        OPTIONAL, -- Cond InitialBWP-Only
   searchSpace SIB1                 SearchSpaceId          OPTIONAL, -- Need S
   searchSpaceOtherSystemInformation SearchSpaceId         OPTIONAL, -- Need S
   pagingSearchSpace                SearchSpaceId  OPTIONAL, -- Need S
   ra-SearchSpace                   SearchSpaceId     OPTIONAL, -- Need S
   ...,
   [[PagingSearchSpaceList          SEQUENCE (SIZE (1..32)) OF SearchSpaceId   OPTIONAL,   -- Need S
}                                 SEQUENCE {
SearchSpace ::=
   SearchSpaceId                    SearchSpaceId,
   controlResourceSetId             ControlResourceSetId
}
```

Example 2: Configuration methods B: Different Coreset which determine the frequency domain information for the PDCCH (DCI) of paging. Similar to above, different controlResourceSets are used to different paging configurations (indicated in bold italicized text below).

```
PDCCH-ConfigCommon ::=        SEQUENCE {
   controlResourceSetZero           ControlResourceSetZero  OPTIONAL, -- Cond InitialBWP-Only
   commonControlResourceSet         ControlResourceSet      OPTIONAL, -- Need R
   searchSpaceZero                  SearchSpaceZero         OPTIONAL, -- Cond InitialBWP-Only
   searchSpace SIB1                 SearchSpaceId           OPTIONAL, -- Need S
   searchSpaceOtherSystemInformation SearchSpaceId          OPTIONAL, -- Need S
   pagingSearchSpace                SearchSpaceId  OPTIONAL, -- Need S
   ra-SearchSpace                   SearchSpaceId     OPTIONAL, -- Need S
   ...,
   [[pagingcontrolResourceSetList        SEQUENCE (SIZE (1..32)) OF controlResourceSetId   OPTIONAL
   - - Need S
}
```

Example 2: Besides the service type the multiple paging configurations can also be configured based on different variables. For example, for the network type, the multiple paging configurations can be indicated for each network type (e.g., CAG or SNPN or PLMN) as indicated in bold italicized text below.

```
Example DownlinkConfigCommonSIB information element

-- ASN1START
-- TAG-NDOWNLINKCONFIGCOMMONSIB-START
DownlinkConfigCommonSIB         ::= SEQUENCE {
   frequencyInfoDL                  FrequencyInfoDL-SIB,
   initialDownlinkBWP               BWP-DownlinkCommon,
   bcch-Config                      BCCH-Config,
   pcch-Config                      PCCH-Config,
   ...,
   [[pcch-ConfigList               PCCH-ConfigList  OPTIONAL,]]
}
PCCH-Config-SNPN ::=_             SEQUENCE {
   defaultPagingCycle                    PagingCycle
   ....Other PCCH configuration parameters
}
PCCH-Config-CAG ::=_              SEQUENCE {
   defaultPagingCycle                    PagingCycle
   ....Other PCCH configuration parameters
}
-- TAG-DOWNLINKCONFIGCOMMONSIB-STOP
-- ASN1STOP
```

Note: the other multiple configurations can also be adopted, for example, different paging search space or different paging CORESET (control resource set) can be used for SNPN or CAG respectively II. Techniques for Mitigating Paging Collision for Multiple Subscriber Identity Module (SIM) Scenario II.(a). Introduction In LTE, for the multi-sim, the paging collision is addressed based on the UE implementation. For example, once the paging occasions are overlapped for the two SIMs, the UE may fail to detect the paging on the other SIM card. Currently, in NR, the similar paging frame (PF) and paging occasion (PO) calculation formula are determined by the following formula:

SFN for the PF is determined by: $(SFN + PF\_offset) \bmod T = (T \text{ div } N) * (UE\_ID \bmod N)$ Index ($i\_s$), indicating the index of the PO is determined by: $i\_s = \text{floor } (UE\_ID/N) \bmod Ns$ The following parameters are used for the calculation of PF and $i\_s$ above:
  T: Discontinuous reception (DRX) cycle of the UE (T is determined by the shortest of the UE specific DRX value, if configured by RRC or upper layers, and a default DRX value broadcast in SIB. If UE specific DRX is not configured by RRC or by upper layers, the default value is applied).
  N: number of total paging frames in T
  Ns: number of paging occasions for a PF
  PF_offset: offset used for PF determination
  UE_ID: 5G-S-TMSI mod 1024
  The PDCCH monitoring occasions for paging are determined according to pagingSearchSpace and firstPDCCH- MonitoringOccasionOfPO if configured. Otherwise, when SearchSpaceId=0 is configured for pagingSearchSpace, the PDCCH monitoring occasions for paging are same as for RMSI. The UE_ID is the 10 least significant bits of 5G-S-TMSI, which is allocated by the serving network. PF_offset, T, N, Ns and are all configured by the serving network. For a UE with multi-sim, the UE may camp on different network and has to detect paging from the different network. Obviously for the UE with the single RX, the Paging collision may happen when paging occurrences associated with the multiple Universal Mobile Telecommunications System Subscriber SIM (USIMs) are overlapping in time.

Currently, in new radio (NR) Release-17 (R17), the paging collision is proposed to be solved with network coordination for UE with Multi-SIM. The issue of paging collision is analyzed from two perspectives. First, from CN perspective, the UE request the network to Reallocate the 5G Short Temporary Mobile Subscriber Identity (5G-STMSI) once the UE detects paging collision. From the CN perspective, the UE need to indicate the some 5G-STMSI reallocation assistance information to the network for the new 5G-STMSI selection. However, the description and report for the 5G-STMSI reallocation assistance information is still an FFS issue. Second from the RAN node perspective, the paging collision problem can be using additional PO or random PO. From the RAN node perspective, the PO for the Idle state can be a subset of the POs in the inactive state. When the Network enters into the inactive state by accident, but the UE is at Inactive state, the UE still can detect the paging. However, under the current technology, even if additional PO or random PO scheme were to be adopted, the current technology cannot ensure that the PO for the Idle state is a subset of the POs in the inactive state.

II.(b) Example Technical Solutions for Mitigating Paging Collision for Multiple SIM Scenario II.(b).i. Technique 1: Description and Report for the 5G-STMSI Reallocation Assistance Information In some embodiments, the UE can report the value of UE_ID modulus N or the value of floor (UE_ID/N) modulus Ns that the network can avoid to use, where N is a number of total paging frames in a paging cycle and Ns is a number of paging occasions per paging frame. The value for UE_ID can be the value for 5G-STMSI. In this patent document, the term "modulus" can be referred to as "mod." The following shows example steps that the UE, RAN node and CN can perform:

Step 1: The RAN node indicates the N and/or the Ns value to the CN during the NG-C interface setup.

Step 2: The UE send 5G-STMSI reallocation request and report the value of UE_ID mod N (referred to as "first value") or value of floor (UE_ID/N) mod Ns (referred to as "second value") that the network can avoid using when determining a new 5G-STMSI for the UE.

Step 3: Then network reallocate the new 5G-STMSI based on the (N or Ns) and (first value or second value).

II.(b).ii. Implementation Examples for Reporting Paging Collision for the Multi-SIM Example 1 to 3 in Section II.(b).ii. are for the 5G-STMSI reallocation and Example 4 in Section II.(b).ii. is for the inactive PO calculation.

Example 1: 5G-STMSI Reallocation Procedures

Figure 5:
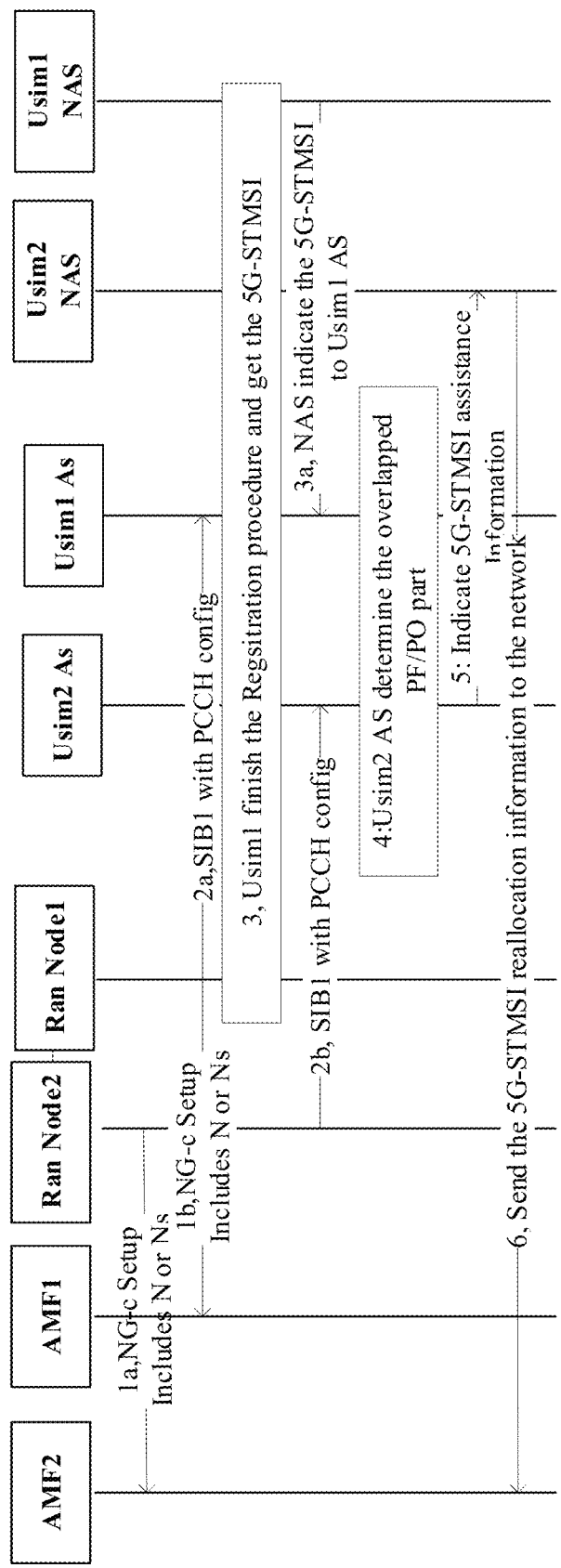
FIG. 5 shows an example 5G Short Temporary Mobile Subscriber Identity (5G-STMSI) reallocation procedure.

FIG. 5 shows an example 5G-STMSI reallocation procedure.

Step 1: The RAN node informs N or Ns Value to the CN,

Step 2: UE receive the SIB from the RAN, where the SIB includes the PCCH configuration information Step 3: Usim1 finish the registration procedure and get the 5G-STMSI Step 4: Usim2 determine the overlapping PF/PO part with Usim1 AS, the detail can refer to Example 2

Step 5: Usim 2 AS layer in the UE indicate the 5 g-STMSI reallocation assistance information to the Usim2 NAS layer in the UE. The detail can refer to Example 2

Step 6: Usim 2 NAS layer in the UE reports the 5 g-STMSI reallocation assistance information to the network Example 2: 5G-STMSI Reallocation Assistance Information UE_ID mod N can be used to determine the PF location in paging cycle T (in radio frames), e.g. UE_ID mod N=0 for the first PF and so on. In other words, the first PF can be associated with the value 0.

Floor (UE_ID/N) mod Ns can be used to determine the PO location in a PF, e.g. (UE_ID/N) mod Ns=0 for the first PO and so on. In other words, the first PO can be associated with the value 0.

Usim1: If the UE ID (or 5G-STMSI) mod N=1, the PCCH-Config parameters included in the report to be sent to Usim 2 NAS can be as shown below with example values:

PF_Offset=0
Tidle=rf64
UE_ID=1
N=1/16 T=4 (4 Paging frames in T)
Ns=2 (i.e. 2 POs per PF)
(SFN+PF_offset) mod T=(T div N)*(UE_ID mod N)==>SFN mod 64=16*(1 mod 4) The second PF in each T
SFN=64n+16 n=1 . . . 15
i_s=floor (UE_ID/N) mod Ns=0 means the first PO Usim 2: If the PCCH-Config parameters in the SIB are same as the Usim1, there is no time difference between two networks. Thus, the PF and PO are the same for the USIM1 and USIM2, and to avoid the overlapping, the USIM2 can avoid receiving paging on the first PO of the second PF. Thus, to avoid the overlap the UE_ID mod N may not equal to 1 or the floor (UE_ID/N) mod Ns may not equal to 0

Figure 6:
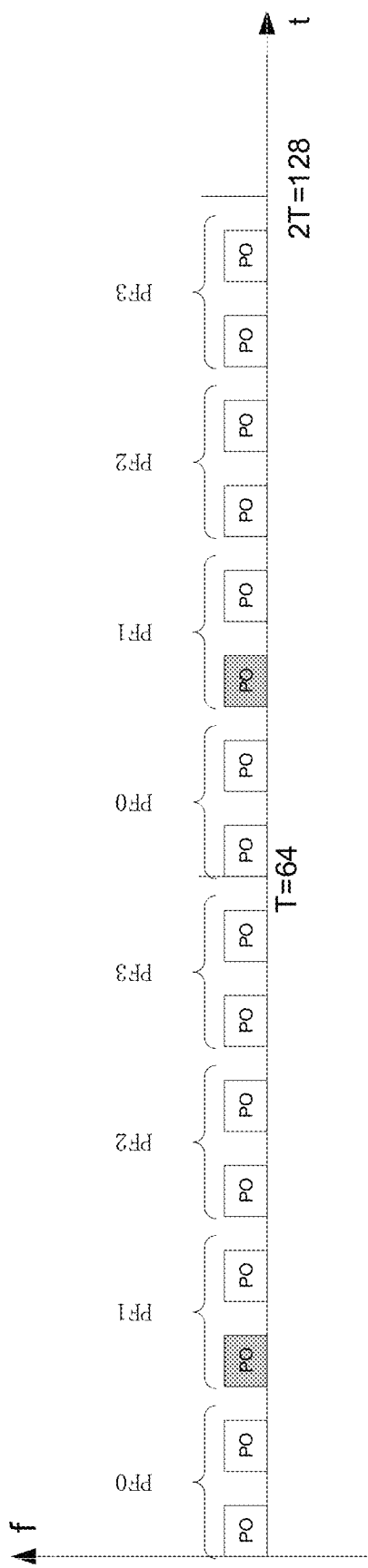
FIG. 6 shows a paging collision scenario without time difference between paging frames (PFs) and paging occasions (POs) for two Universal Mobile Telecommunications System Subscriber SIM (USIMs) or two networks.

FIG. 6 shows a paging collision scenario without time difference between paging frames (PFs) and paging occasions (POs) for two USIMs. FIG. 6 shows four paging frames in a paging cycle of 64 radio frames, where each paging frame includes two paging occasions. In FIG. 6, the PF and PO for USIM1 and USIM 2 are the same so that the PF and POs overlap.

In some embodiments, the RAN node or UE can inform N or Ns Value to the CN, while the UE can include PF location in a T (e.g., (UE_ID mod N)=1, which may mean that the PF location is the second PF location, shown as PF1 in FIG. 6) and PO location in a PF (e.g., floor (UE_ID/N) mod Ns=0, which may mean that the PO location is the first PO location, shown as highlighted PO in FIG. 6) to be sent to the CN (e.g., UE can inform the UE's NAS layer, then NAS send message to CN), then the CN can avoid reallocating the 5G-STMSI to have UE_ID values that satisfy (UE_ID mod N)=1 and floor(UE_ID/N) mod Ns=0.

In some embodiments, the UE can only report T(UE_ID mod N)=1, then the CN can avoid reallocating the 5G-STMSI that satisfy (UE_ID mod N)=1

In some embodiments, the UE can only report (floor (UE_ID/N) mod Ns=0), then the CN can avoid reallocating the 5G-STMSI that satisfy (floor (UE_ID/N) mod Ns=0)

Example 2.1: 5G-STMSI Reallocation Assistance Information

Example 2 assumes that the PCCH-Config parameters in the SIB are same as the Usim1 and there is no time difference between two networks. In Example 2.1, there is time difference between two networks and the PCCH-Config parameters are still same.

Figure 7:
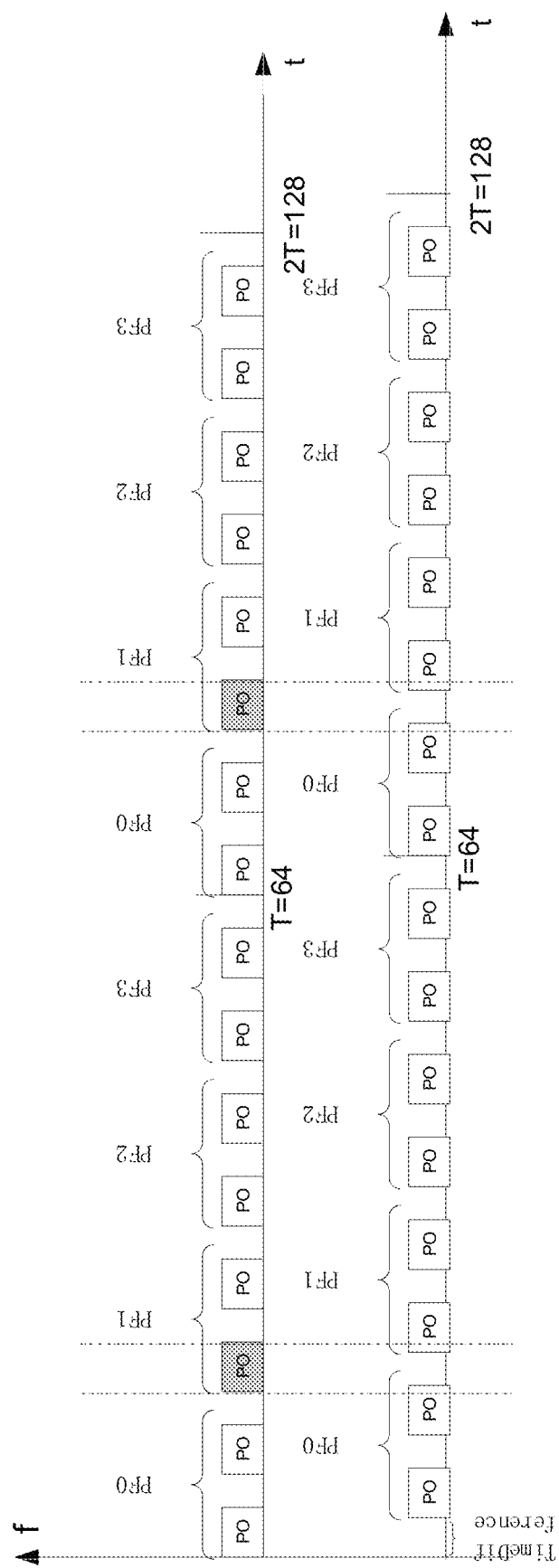
FIG. 7 shows a paging collision scenario with timing difference between the POs and PFs for two USIMs or two networks.

FIG. 7 shows a timing difference between the POs and PFs for the two networks are different. The top timing diagram in FIG. 7 shows the POs and PFs associated with Usim1 and the bottom timing diagram in FIG. 7 shows the POs and PFs associated with Usim2. In FIG. 7, the highlighted PO of Usim1 overlaps with part of the second PO in the first PF of Usim2 and the highlighted PO of Usim1 overlaps with part of the first PO of the second PF of Usim2. To avoid paging collision, the UE can report the following information to the CN:

PF locations in a T(UE_ID mod N)=0 and PO location in a PF (floor (UE_ID/N) mod Ns=1)

PF locations in a T(UE_ID mod N)=1 and PO location in a PF (floor (UE_ID/N) mod Ns=0)

then the CN can avoid reallocating the 5G-STMSI to have UE_ID values that satisfy (UE_ID mod N)=1 and (UE_ID/N) mod Ns=0 or that satisfy (UE_ID mod N)=0 and (UE_ID/N) mod Ns=1.

In some embodiments, the UE can only report T(UE_ID mod N)=0, 1. Then the network can avoid to reallocating the 5G-STMSI that satisfy T(UE_ID mod N)=0, 1.

Example 3: Element Definition

Example 3.1: Only Report PF Location

Figure 8:
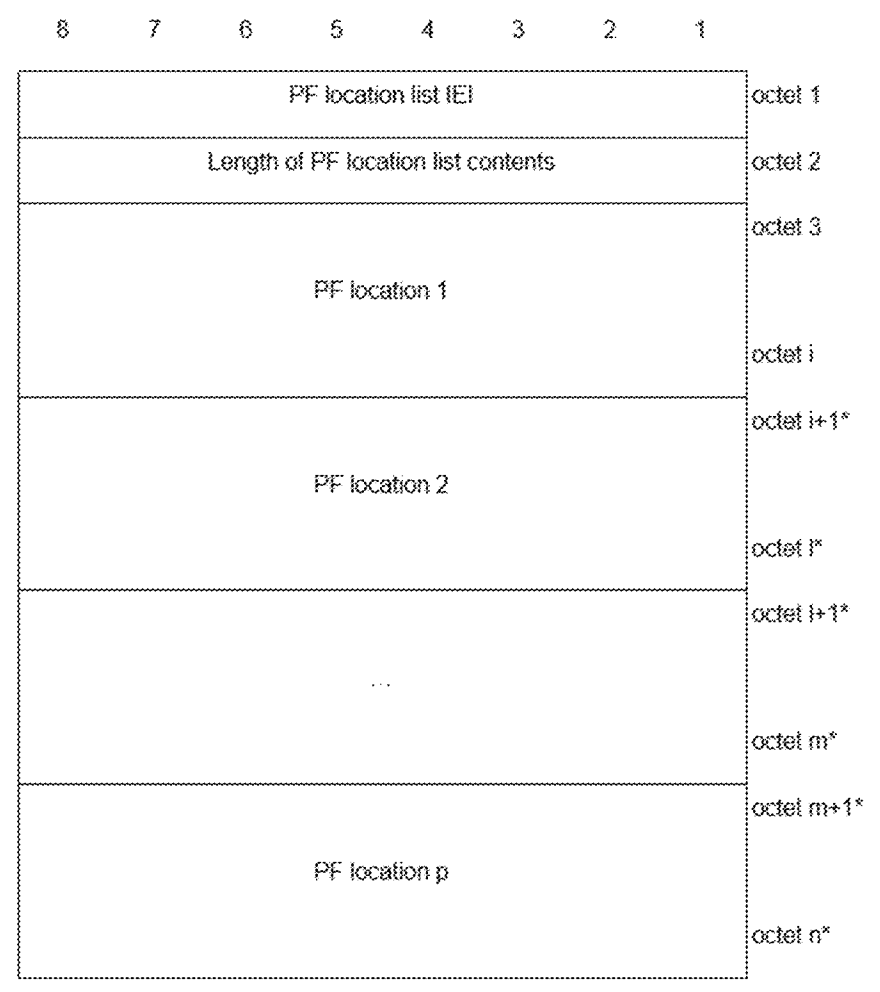

FIG. 8 shows an example layer 3 coding of PF location information list. The term IEI is information element identity.

Example 3.2: Only Report PO Location

For the PO location, there is 4 POs at most, so a 4 bits bitmap can be used to indicate related PO. The PObitmap can be ****, where the most significant bit indicates that the first PO may be avoided. For example, a value of the most significant bit can indicate that the first PO may be avoided.

Example 3.3: Report Both PF and PO Location

FIG. 9 shows an example layer3 coding of PF and PO location information list.

II.(b).iii. Technique 2: Keeping the PO for the Idle State to be a Subset of the POs in the Inactive State with the Random PO Scheme If the UE determines or finds that the paging cycle of the Inactive state are the same as that in idle state, the PFoffsetidle may be used to determine location of a paging message using the following example equation:

$$PFoffsetidle = (SFN \text{ div } Tidle) \text{ mod } k,$$

where SFN is the system frame number, Tidle is the paging cycle in idle state, and k is a pre-determined value that can be configured in SIB or can be a fixed value.

If the UE determines or finds that the paging cycle of the inactive state is not the same as that of in the idle state, then a new PFoffsetInactive can be introduced to determine location of a paging message using the following example equation:

$$PFoffsetInactive = (PFoffsetidle + (SFN \text{ div } Tinactive) \text{ mod } k) \text{ mod } Kinactive$$

where Tinactive is the paging cycle in inactive state, k is a first pre-determined value, and Kinactive is a second pre-determined value. The values for k and Kinactive can be configured in SIB or can be a fixed value.

The RAN node can broadcast a SIB to UE, where the SIB includes an indication that indicates that the RAN node supports paging enhancement. The UE, upon receiving the indication, can calculate PFoffsetidle and PFoffsetInactive for the example scenarios described in Section II of this patent document. When UE moves to another RAN node that does not support the paging enhancement, the UE can calculate the PF based on the legacy formula. In other words, the UE can know which paging formula to use from the SIB even if the UE has registered with paging enhancement capability.

In some embodiments, PFoffsetInactive may be equal to (((SFN div Tinactive) mod k) mod Kinactive). In such embodiments, PFoffsetidle may be zero if the PO of the inactive state overlaps with the PO of the Idle state. Thus, in such embodiments, the PFoffsetidle value can be used, for others PFoffsetInactive can be adopted.

II.(b).iii.(A). Example 4.1—SIB Broadcasting and Paging Enhancement Related Parameters Transmitting The RAN node can broadcast paging enhancement support indication in the SIB to UE (as shown below in bold italicized text).

| DownlinkConfigCommonSIB information element |
|---|

```
-- ASN1START
-- TAG-DOWNLINKCONF
DownlinkConfigCommonSIB    ::=   SEQUENCE {
    frequencyInfoDL           FrequencyInfoDL-SIB,
    initialDownlinkBWP          BWP-DownlinkCommon,
    bcch-Config               BCCH-Config,
    pcch-Config               PCCH-Config,
    ...,
    [[PagingEnhancementSupport  BOOLEAN]]
}                            SEQUENCE {
PCCH-Config :=
```

| DownlinkConfigCommonSIB information element |
| --- |

```
defaultPagingCycle            PagingCycle,
nAndPagingFrameOffset         CHOICE {
    oneT                        NULL,
    half                        INTEGER (0..1),
    quarterT                    INTEGER (0..3),
    oneEighthT                  INTEGER (0..7),
    oneSixteenthT               INTEGER (0..15)
},
ns                            ENUMERATED {four, two, one},
firstPDCCH-MonitoringOccasionOfPO CHOICE {
    sCS15KHZoneT                SEQUENCE (SIZE (1..maxPO-perPF)) OF INTEGER (0..139),
    ....
    } OPTIONAL,               -- Need R
    ....
-- TAG-DOWNLINKCONFIGCOMMONSIB-STOP
-- ASN1STOP
```

In some embodiments, the RAN node can implicitly indicate a support for paging enhancement if the RAN node indicates paging enhancement parameters such as k value (shown in bold italicized text in the example SIB below) for the PFoffsetidle calculation in the SIB or if the RAN node indicates paging enhancement parameters such kinactive (shown in bold italicized text in the example RRC message below).

| DownlinkConfigCommonSIB information element |
| --- |

```
-- ASN1START
-- TAG-DOWNLINKCONF
DownlinkConfigCommonSIB ::= SEQUENCE{
    frequencyInfoDL           FrequencyInfoDL-SIB,
    initialDownlinkBWP        BWP-DownlinkCommon,
    bcch-Config               BCCH-Config,
    pcch-Config               PCCH-Config,
    ...,
}
PCCH-Config ::=               SEQUENCE {
    defaultPagingCycle          PagingCycle,
    nAndPagingFrameOffset       CHOICE {
        oneT                      NULL,
        halfT                     INTEGER (0..1),
        quarterT                  INTEGER (0..3),
        oneEighthT                INTEGER (0..7),
        oneSixteenthT             INTEGER (0..15)
    },
    ns                          ENUMERATED {four, two, one},
    firstPDCCH-MonitoringOccasionOfPO CHOICE {
        sCS15KHZoneT              SEQUENCE (SIZE (1..maxPO-perPF)) OF INTEGER (0..139),
        ....
        } OPTIONAL,             -- Need R
    ...,
    ---For the PFoffsetidle calculation
    K                         INTEGER(0..MaxValue)   OPTIONAL,}
-- TAG-DOWNLINKCONFIGCOMMONSIB-STOP
-- ASN1STOP
```

| RRCRelease message |
| --- |

```
-- ASN1START
-- TAG-RRCRELEASE-START
RRCRelease ::=                SEQUENCE {
    rrc-TransactionIdentifier    RRC-TransactionIdentifier,
    criticalExtensions           CHOICE {
        rrcRelease                 RRCRelease-IEs,
        criticalExtensionsFuture   SEQUENCE { }
    }
}
RRCRelease-IEs ::=            SEQUENCE {
    redirectedCarrierInfo        RedirectedCarrierInfo         OPTIONAL, -- Need N
    cellReselectionPriorities    CellReselectionPriorities     OPTIONAL, -- Need R
    suspendConfig                SuspendConfig                 OPTIONAL, -- Need R
```

| RRCRelease message |
|---|
| ...}<br>SuspendConfig ::=         SEQUENCE {<br>  fullI-RNTI                I-RNTI-Value,<br>  shortI-RNTI              ShortI-RNTI-Value,<br>  ran-PagingCycle          PagingCycle,<br>  ran-NotificationAreaInfo    RAN-NotificationAreaInfo            OPTIONAL, -- Need M<br>  t380                     PeriodicRNAU-TimerValue              OPTIONAL, -- Need R<br>  nextHopChainingCount     NextHopChainingCount,<br>  ...,<br>  ---For the *PFoffsetInactive calculation*<br>  Kinactive                                 *INTEGER (0..MaxValue) OPTIONAL,*<br>}<br>-- TAG-RRCRELEASE-STOP<br>-- ASN1STOP |

II.(b).iii.(B). Example 4.2—Poffset for Idle and Inactive State Calculation

For the POs in the inactive state overlapped with those in the Idle state, the PFoffsetidle may be used, while for the POs that only used at Inactive state, introduce a new PFoffsetInactive. The following example formulas can be used:

PFoffsetidle=(SFN div Tidle)mod $k$

PFoffsetInactive=(PFoffsetidle+(SFN div Tinactive) mod $k$)mod kinactive

Thus, if the paging cycle of the Inactive state are the same as that in idle state, the PFoffsetidle may be used, else introduce a new PFoffsetInactive. The following shows example calculations and operating using example values for PFoffsetidle Step 1: Calculate the PFoffsetidle. The last term below (SFN=72 PFoffsetidle=1) is in bold italicized text to indicate that the calculation indicates that PFoffsetidle is not equal to zero and that there would be an offset in with the examples values shown below.

```
PF_Offset = 0
K = 2
Tidle = rf64
UE_ID= 1
N=1/16 T =4 (4 Paging frames in T)
Ns=  2 (i.e. 2 POs per PF)
Add PFoffsetidle = (SFN div Tidle)mod k to the Idle state PF.
PFoffsetidle = (SFN div 64)mod 2
SFN mod 64 = 4((1+PFoffsetidle) mod 16)
SFN = 4 PFoffsetidle= 0
SFN = 72 PFoffsetidle = 1
```

Figure 10:
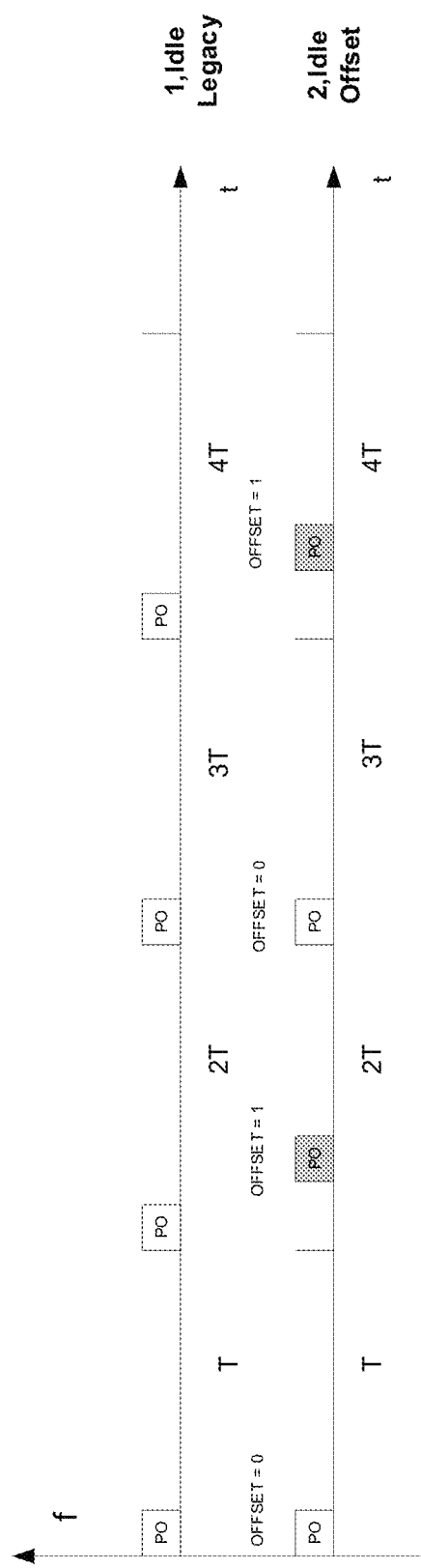
FIG. 10 shows the paging occasion with the PFoffsetidle in comparison to the current idle state paging occasions.

FIG. 10 shows the paging occasions with the calculated PFoffsetidle in the second row (shown as Idle offset) in comparison to the current idle state paging occasions.

Step 2: Calculate the PFoffsetInactive

Figure 11:
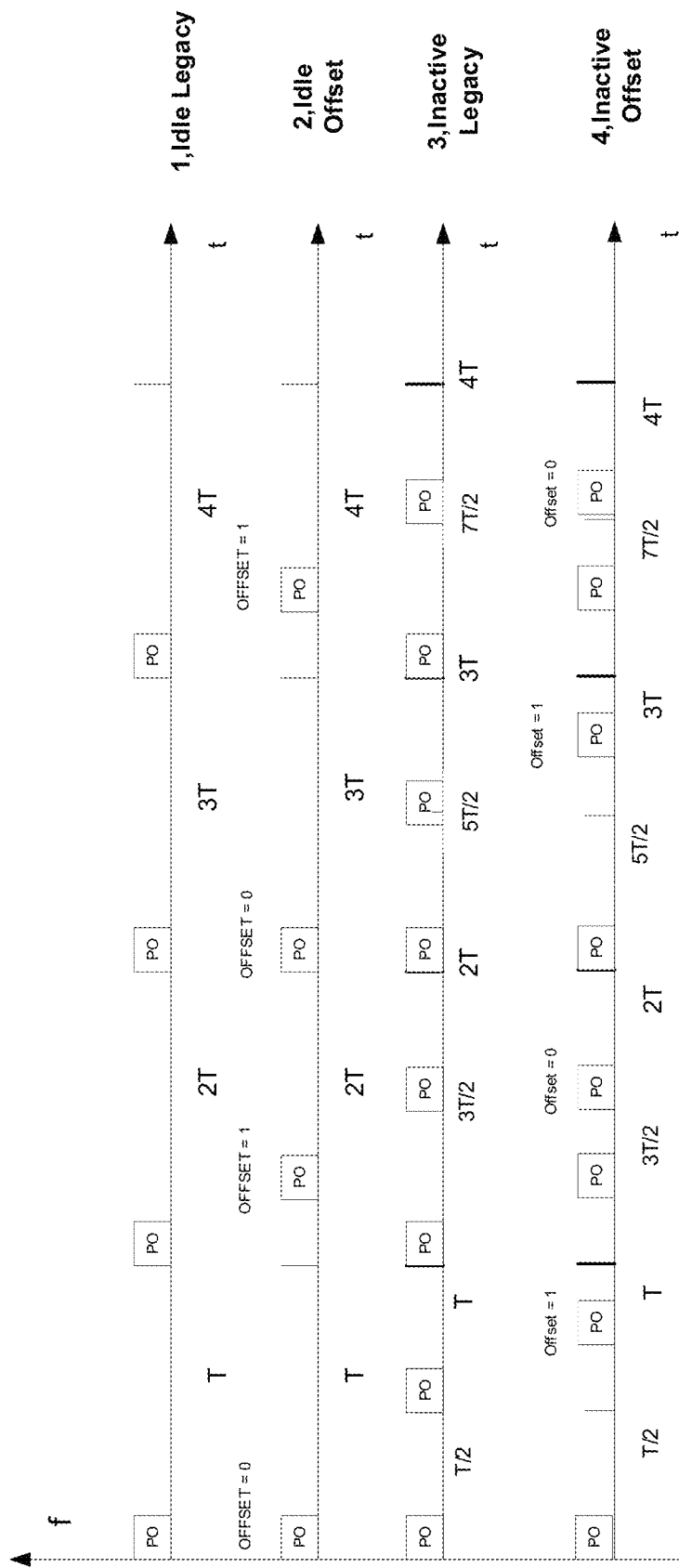
FIG. 11 shows difference between paging occasions determined using example techniques compared to current paging occasions determined using current techniques.

FIG. 11 shows the paging occasions with the calculated PfoffsetInactive shown in Row 4 (shown as Inactive Offset). Row 3 of FIG. 11 shows the POs based on the legacy (or current) PO calculation formula. In Row 4 of FIG. 11, POs are calculated with PFoffsetInactive. The PO (in bold italicized text below) for the Idle state can be a subset of the POs in the inactive state.

```
T inactive = rf32
Kinactive =2
PFoffsetidle = (SFN div 64)mod 2
PFoffsetInactive= (PFoffsetidle + (SFN div Tinactive) mod k)mod Kinactive =>
PFoffsetInactive = ((SFN div 64)mod 2+ (SFN div 32)mod 2)mod 2
SFN mod 32 = 4((1+PFoffsetInactive ) mod 16)
SFN = 4 PFoffsetidle= 0 PFoffsetInactive = 0
SFN = 40 PFoffsetidle= 0 PFoffsetInactive = 1
SFN = 72 PFoffsetidle=1 PFoffsetInactive = 0
SFN = 100 PFoffsetidle= 1 PFoffsetInactive = 0
```

III. Introduction to Network Selection for Non-Public Network (NPN)

In the current NPN, there is an allowed closed access group (CAG) list, in which the multiple public land mobile network (PLMN)+CAG identifier (ID) are included. The NAS layer of the indicates to the UE's AS layer with the allowed CAG list. If the UE want to get the normal service, the UE selects cell with the PLMN+CAG ID that included in the allowed CAG list.

The 5G system can be designed to support a mechanism for a PLMN to control whether a user of a UE can manually select a non-public network hosted by this PLMN that the UE is not authorized to select automatically. In the legacy scheme, there is an allowed CAG list in UE that indicates to the UE that the UE can only access the CAG ID within the allowed CAG list. The techniques described in Section III can enable a UE to access the CAG ID that are outside of (or not included in) the allowed CAG list so that the corresponding PLMN can allow a UE to manually or automatically select a NPN hosted by the PLMN even if the UE is not authorized to select the NPN automatically. For example, for a PLMN, the SIB can indicate whether a user of a UE can manually select a NPN hosted by the PLMN that the UE is not authorized to select automatically. However, in the current technology, the SIB does not include such an indication.

Section III of this patent document example techniques that can enable a wireless system (e.g., 5G system) to support a mechanism for a PLMN to control whether a user of a UE can manually select an NPN hosted by the PLMN that the UE is not authorized to select automatically. The UE is not authorized to select an NPN hosted by the PLMN if, for example, one or more CAG IDs in the PLMN 1 for the NPN are not included in the allowed CAG list.

Example techniques are described for design the of the SIB to support at least such a technique.

III.(a). Overview of Technical Solutions

Network side: RAN node may broadcast in, for example, the SIB, information to indicate to the UE whether the UE can manually select an NPN hosted by the PLMN that the UE may not be authorized to select automatically. The UE can further determine whether to access the NPN.

UE Side: The UE AS layer can receive the indication sent from the RAN node via SIB and can send such information to the UE's NAS layer. The UE NAS layer can determine whether to access the related NPN that is not included in an allowed cell access list (e.g., not in allowed CAG list) based on the received indication. For example, the UE can, upon determining that the information indicates a manual or automatic selection is allowed, access a PLMN associated with an NPN. In another example, the UE can, upon determining that the information does not indicates a manual or automatic selection is allowed, determines that the UE cannot access a PLMN associated with an NPN.

III.(b) Example Details of Technical Solutions

The RAN node can include in an SIB an indication of network selection mode which can be per PLMN or Per CAG ID. In some embodiments, a same indication can be used for manual mode and automatic mode. In some embodiments, a first indication is used for a manual mode and a second indication (different from the first indication) can be used for an automatic mode. In the manual mode, the user of a UE can manually select a non-public network hosted by a PLMN that the UE is not authorized to select automatically. And in the automatic mode, a UE can automatically select a non-public network hosted by the PLMN that the UE is not authorized to select automatically. In an example implementation, in the automatic mode, the UE can use the CAG ID that is outside of (or not included in) the allowed CAG list if the UE determines that there is no suitable CAG ID included in the allowed CAG list that the UE can use.

At the Network side (e.g., CN), on the Ng interface, the AMF can indicate one or more of these indications (e.g., manual mode and/or automatic mode indication(s)) to the RAN Node. In some embodiments, at the Network side, on the F1 interface, the central unit (CU) can indicate the manual and/or automatic mode indication information to the distributed unit (DU), and DU can encode this indication information into the SIB 1.

Examples 1-6 described in Section III describe further implementation examples for NPN network selection techniques

Example 1: New Indication in the SIB

Example 1, Option a: Indication Per PLMN

In some embodiments, a SIB can include a manualModeallowed indication per PLMN (shown below in bold italicized text). The manualModeallowed in this embodiment can indicate whether a user of a UE can manually select a non-public network hosted by the PLMN that the UE is not authorized to select automatically.

```
CellAccessRelatedInfo information element

-- ASN1START
-- TAG-CELLACCESSRELATEDINFO-START
CellAccessRelatedInfo ::=       SEQUENCE {
  ...,
  [[
  npn-IdentityInfoList-r16        NPN-IdentityInfoList-r16 OPTIONAL -- Need R
  ]]
}
NPN-IdentityInfoList-r16 ::=    SEQUENCE (SIZE (1..maxNPN-r16)) OF NPN-IdentityInfo-r16
NPN-IdentityInfo-r16 ::=        SEQUENCE {
  npn-IdentityList-r16          SEQUENCE (SIZE (1..maxNPN-r16)) OF NPN-Identity-r16,
  trackingAreaCode-r16          TrackingAreaCode,
  ranac-r16                     RAN-AreaCode           OPTIONAL,           -- Need R
  cellIdentity-r16              CellIdentity,
  cellReservedForOperatorUse-r16    ENUMERATED {reserved, notReserved},
  ...
}
NPN-Identity-r16 ::=            CHOICE {
  pni-npn-r16                   SEQUENCE {
    plmn-Identity-r16             PLMN-Identity,
    cag-IdentityList-r16          SEQUENCE (SIZE (1..maxNPN-r16)) OF CAG-Identity-r16
    *manualModeallowed*             *ENUMERATED {true} OPTIONAL,        -- Need R*
  },
  snpn-r16                      SEQUENCE {
  ... }
}
-- TAG-CELLACCESSRELATEDINFO-STOP
-- ASN1STOP
```

Example 1, Option b: Indication Per CAG ID

In some embodiments, a SIB can include a manualModeallowed indication per CAG ID (shown below in bold italicized text). The manualModeallowed in this embodiment can indicate whether a user of a UE can manually select a NPN hosted by the CAG ID that the UE is not authorized to select automatically.

| CellAccessRelatedInfo information element |
|---|
| -- ASN1START<br>-- TAG-CELLACCESSRELATEDINFO-START<br>CellAccessRelatedInfo ::=      SEQUENCE {<br>  ...,<br>  [[<br>  npn-IdentityInfoList-r16        NPN-IdentityInfoList-r16 OPTIONAL -- Need R<br>  ]]<br>}<br>NPN-IdentityInfoList-r16 ::=    SEQUENCE (SIZE (1..maxNPN-r16)) OF NPN-IdentityInfo-r16<br>NPN-IdentityInfo-r16 ::=      SEQUENCE {<br>  npn-IdentityList-r16    SEQUENCE (SIZE (1..maxNPN-r16)) OF NPN-Identity-r16,<br>  trackingAreaCode-r16    TrackingAreaCode,<br>  ranac-r16              RAN-AreaCode       OPTIONAL,        -- Need R<br>  cellIdentity-r16        CellIdentity,<br>  cellReservedForOperatorUse-r16    ENUMERATED {reserved, notReserved},<br>  ...<br>}<br>NPN-Identity-r16 ::=        CHOICE {<br>  pni-npn-r16           SEQUENCE {<br>    plmn-Identity-r16       PLMN-Identity,<br>  *cag-IdentityInfoList-r16*    *SEQUENCE (SIZE (1..max NPN-r16)) OF CAG-IdentityInfo-r16*<br>  },<br>  snpn-r16             SEQUENCE {<br>  ... }<br>}<br>*CAG-IdentityInfo-r16 ::=   SEQUENCE*<br>*{*<br>  *cag-Identity List-r16 SEQUENCE (SIZE (1..max NPN-r16)) OF CAG-Identity-r16*<br>  *manualModeallowed         ENUMERATED {true} OPTIONAL,    - - Need R*<br>*}*<br>-- TAG-CELLACCESSRELATEDINFO-STOP<br>-- ASN1STOP |

Example 2: Indication Procedure

Figure 12:
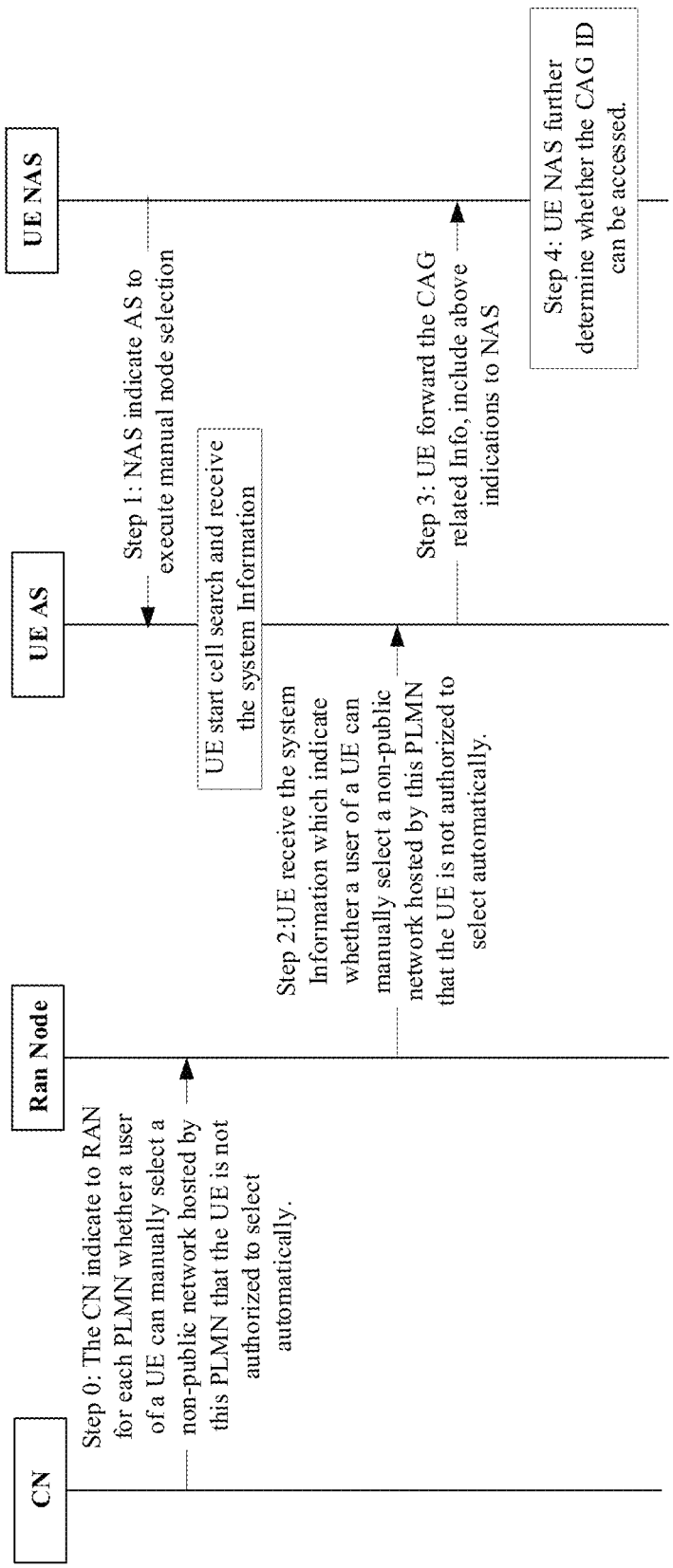
FIG. 12 shows an example procedure for indicating whether a user of a UE can manually select a non-public network (NPN) hosted by a public land mobile network (PLMN) that the UE is not authorized to select automatically.

FIG. 12 shows an example procedure for indicating whether a user of a UE can manually select a NPN hosted by a PLMN that the UE is not authorized to select automatically.

Step 0: The CN indicate to the RAN node for each PLMN whether a user of a UE can manually select a non-public network hosted by the PLMN that the UE is not authorized to select automatically.

Step 1: the UE's NAS layer indicates the UE's AS layer to execute manual node selection.

Step 2: UE receives a SIB that includes an indication on whether a user of a UE can manually select a non-public network hosted by the PLMN that the UE is not authorized to select automatically.

Step 3: UE forward to the UE's NAS layer the CAG related information including the indication received in the SIB regarding whether the user of the UE can manually select the NPN.

Step 4: UE NAS can further determine whether the CAG ID can be accessed.

Figure 13:
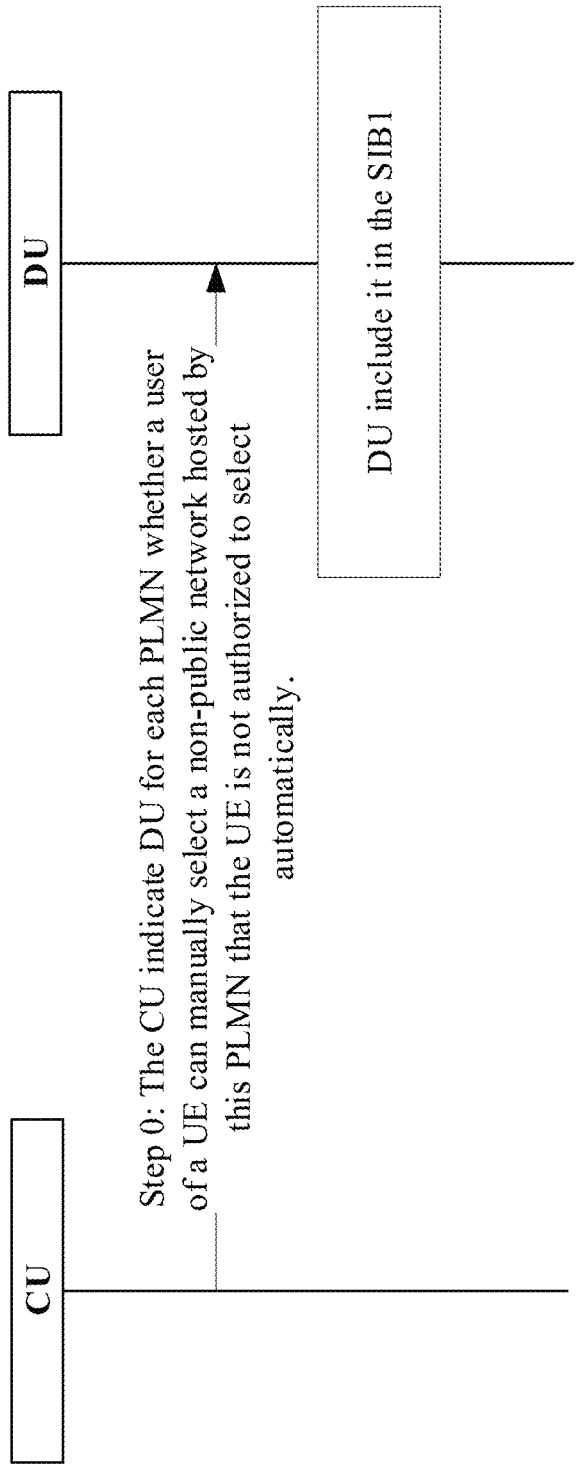
FIG. 13 shows an example flow diagram of a central unit (CU) sending send to a distributed unit (DU) one or more selection related indications for each PLMN.

Example 3: Send the Manual and/or Automatic Mode Indication(s) from One Node to the Other Node Example 3.1—from CU to DU Through F1 Interface FIG. 13 shows an example flow diagram of a CU sending to a DU one or more selection related indications (e.g., manual mode and/or automatic mode) for each PLMN as to whether a user of the UE can manually select an NPN hosted by the PLMN that the UE is not authorized to select automatically. The DU can include the indication(s) in the SIB (e.g., SIB1) to be sent to the UE.

Example 3.2—from AMF to gNB Through NG Interface

The AMF can send to the gNB an indication for each PLMN as to whether a user of a UE can manually select a NPN hosted by the PLMN that the UE is not authorized to select automatically. The technique used by the AMF can be same or similar to that described in Step 0 in Example 2 in Section III.

Example 4: The Interaction Between UE AS Layer and UE NAS Layer

The UE's NAS layer and AS layer can employ techniques described at least in Step 3 in Example 2 in Section III.

Example 5: Automatic Mode

Example 5.1: Two Indications for the Manual Mode and Automatic Mode Respectively can be Provided

Example 5.1, Option a: Indication Per PLMN

In some embodiments, a SIB can include a manualModeallowed indication and another autoMaticModeallowed indication per PLMN (shown below in bold italicized text). The manualModeallowed in this embodiment can indicate whether a user of a UE can manually select a non-public network hosted by the PLMN that the UE is not authorized to select automatically. The autoMaticModeallowed in this embodiment can indicate whether a UE can automatically select a non-public network hosted by the PLMN that the UE is not authorized to select automatically.

| CellAccessRelatedInfo information element |
|---|
| ```
-- ASN1START
-- TAG-CELLACCESSRELATEDINFO-START
CellAccessRelatedInfo ::=            SEQUENCE {
    ...,
    [[
    npn-IdentityInfoList-r16          NPN-IdentityInfoList-r16 OPTIONAL -- Need R
    ]]
}
NPN-IdentityInfoList-r16 ::= SEQUENCE (SIZE (1..maxNPN-r16)) OF NPN-IdentityInfo-r16
NPN-IdentityInfo-r16 :=              SEQUENCE {
    npn-IdentityList-r16              SEQUENCE (SIZE (1..maxNPN-r16)) OF NPN-Identity-r16,
    trackingAreaCode-r16              TrackingAreaCode,
    ranac-r16                         RAN-AreaCode         OPTIONAL,        -- Need R
    cellIdentity-r16                  CellIdentity,
    cellReservedForOperatorUse-r16           ENUMERATED (reserved, notReserved},
    ...
}
NPN-Identity-r16 ::=                 CHOICE {
    pni-npn-r16                       SEQUENCE {
        plmn-Identity-r16                PLMN-Identity,
        cag-IdentityList-r16             SEQUENCE (SIZE (1..maxNPN-r16)) OF CAG-Identity-r16
        *manualModeallowed              ENUMERATED {true} OPTIONAL,  -- Need R*
        *autoMaticModeallowed           ENUMERATED {true} OPTIONAL,  -- Need R*
    },
    snpn-r16                          SEQUENCE {
... }
}
-- TAG-CELLACCESSRELATEDINFO-STOP
-- ASN1STOP
``` |

Example 5.1, Option b: Indication Per CAG ID

In some embodiments, a SIB can include a manualModeallowed indication and another autoMaticModeallowed indication per CAG ID (shown below in bold italicized text). The manualModeallowed in this embodiment can indicate whether a user of a UE can manually select a non-public network hosted by the CAG ID that the UE is not authorized to select automatically. The autoMaticModeallowed in this embodiment can indicate whether a UE can automatically select a non-public network hosted by the CAG ID that the UE is not authorized to select automatically.

| CellAccessRelatedInfo information element |
|---|
| ```
-- ASN1START
-- TAG-CELLACCESSRELATEDINFO-START
CellAccessRelatedInfo ::=            SEQUENCE {
    ...,
    [[
    npn-IdentityInfoList-r16          NPN-IdentityInfoList-r16 OPTIONAL -- Need R
    ]]
}
NPN-IdentityInfoList-r16 ::=         SEQUENCE (SIZE (1..maxNPN-r16)) OF NPN-IdentityInfo-r16
NPN-IdentityInfo-r16 ::=             SEQUENCE {
    npn-IdentityList-r16              SEQUENCE (SIZE (1..maxNPN-r16)) OF NPN-Identity-r16,
    trackingAreaCode-r16              TrackingAreaCode,
    ranac-r16                         RAN-AreaCode OPTIONAL, -- Need R
    cellIdentity-r16                  CellIdentity,
    cellReservedForOperatorUse-r16           ENUMERATED {reserved, notReserved},
``` |

| CellAccessRelatedInfo information element |
| --- |
| ...<br>    }<br>    NPN-Identity-r16 ::=                     CHOICE {<br>        pni-npn-r16                          SEQUENCE {<br>            plmn-Identity-r16                    PLMN-Identity,<br>            *cag-IdentityInfoList-r16*           *SEQUENCE (SIZE (1..maxNPN-r16))OF CAG-IdentityInfo-r16*<br>        },<br>        snpn-r16                             SEQUENCE {<br>        ... }<br>    }<br>*CAG-IdentityInfo-r16* ::=   *SEQUENCE*<br>*{*<br>    *cag-IdentityList-r16 SEQUENCE (SIZE (1..maxNPN-r16)) OF CAG-Identity-r16*<br>    *manualModeallowed*                  *ENUMERATED {true}  OPTIONAL,*           -- Need R<br>    *autoMaticModeallowed*              *ENUMERATED {true}  OPTIONAL,*           -- Need R<br>*}*<br>-- TAG-CELLACCESSRELATEDINFO-STOP<br>-- ASN1STOP |

Example 5.2: Manual Mode and Automatic Mode May Use a Same Indication

Example 5.2, Option a: Indication Per PLMN

In some embodiments, a SIB can include a same indication for autoManualModeallowed per PLMN (shown below in bold italicized text). The autoManualModeallowed in this embodiment can indicate whether a user of a UE can manually select or the UE can automatically select a non-public network hosted by the PLMN that the UE is not authorized to select automatically.

| CellAccessRelatedInfo information element |
| --- |
| -- ASN1START<br>-- TAG-CELLACCESSRELATEDINFO-START<br>CellAccessRelatedInfo ::=           SEQUENCE {<br>    ...,<br>    [[<br>    npn-IdentityInfoList-r16             NPN-IdentityInfoList-r16 OPTIONAL -- NeedR<br>    ]]<br>}<br>NPN-IdentityInfoList-r16 ::=        SEQUENCE (SIZE (1..maxNPN-r16)) OF NPN-IdentityInfo-r16<br>NPN-IdentityInfo-r16 ::=             SEQUENCE {<br>    npn-IdentityList-r16                SEQUENCE (SIZE (1..maxNPN-r16)) OF NPN-Identity-r16,<br>    trackingAreaCode-r16                TrackingAreaCode,<br>    ranac-r16                     RAN-AreaCode       OPTIONAL,      -- Need R<br>    cellIdentity-r16                    CellIdentity,<br>    cellReservedForOperatorUse-r16       ENUMERATED {reserved, notReserved},<br>    ...<br>}<br>NPN-Identity-r16 ::=                 CHOICE {<br>    pni-npn-r16                         SEQUENCE {<br>        plmn-Identity-r16                   PLMN-Identity,<br>        cag-IdentityList-r16                SEQUENCE (SIZE (l..maxNPN-r16)) OF CAG-Identity-r16<br>        *autoManualModeallowed*                  *ENUMERATED {true}  OPTIONAL,*      -- Need R<br>    },<br>    snpn-r16                            SEQUENCE {<br>    ... }<br>}<br>-- TAG-CELLACCESSRELATEDINFO-STOP<br>-- ASN1STOP |

Example 5.2, Option b: Indication Per CAG ID

In some embodiments, a SIB can include a same indication for autoManualModeallowed per CAG ID (shown below in bold italicized text). The autoManualModeallowed in this embodiment can indicate whether a user of a UE can manually select or the UE can automatically select a non-public network hosted by the CAG ID that the UE is not authorized to select automatically.

| CellAccessRelatedInfo information element |
|---|
| ```
-- ASN1START
-- TAG-CELLACCESSRELATEDINFO-START
CellAccessRelatedInfo ::=           SEQUENCE {
    ...,
    [[
    npn-IdentityInfoList-r16            NPN-IdentityInfoList-r16 OPTIONAL -- Need R
    ]]
}
NPN-IdentityInfoList-r16 ::=        SEQUENCE (SIZE (1..maxNPN-r16)) OF NPN-IdentityInfo-r16
NPN-IdentityInfo-r16 ::=              SEQUENCE {
    npn-IdentityList-r16              SEQUENCE (SIZE (1..maxNPN-r16)) OF NPN-Identity-r16,
    trackingAreaCode-r16              TrackingAreaCode,
    ranac-r16                         RAN-AreaCode        OPTIONAL,        -- Need R
    cellIdentity-r16                  CellIdentity,
    cellReservedForOperatorUse-r16       ENUMERATED (reserved, notReserved},
    ...
}
NPN-Identity-r16 ::=                 CHOICE {
    pni-npn-r16                       SEQUENCE {
    plmn-Identity-r16                 PLMN-Identity,
 cag-IdentityInfoList-r16            SEQUENCE (SIZE (1..maxNPN-r16))OF CAG-IdentityInfo-r16
    },
    snpn-r16                          SEQUENCE {
    ... }
  }
CAG-IdentityInfo-r16 ::=   SEQUENCE
 {
   cag-IdentityList-r16 SEQUENCE (SIZE (1..maxNPN-r16)) OF CAG-Identity-r16
   autoManualModeallowed ENUMERATED {true} OPTIONAL,       - - Need R
 }
-- TAG-CELLACCESSRELATEDINFO-STOP
-- ASN1STOP
``` |

Example 6: NAS Layer Operation(s)

UE as send 2 PLMN and also the CAG ID information under the 2 PLMN and the one or more indications regarding automatic mode and/or manual mode to the NAS as follows:

In one example, for PLMN1, assuming that there are 2 CAG: CAG ID 1 and CAG ID 2, the UE can access the cell with CAG ID under PLMN1 even if the CAG ID under PLMN1 is not included in the UE's allowed CAG list. Continuing with this example, for PLMN2, assuming that there are 2 CAG: CAG ID 3 and CAG ID 4, the UE cannot access the cell with CAG ID under PLMN1 if the CAG ID under PLMN1 is not included in the UE's allowed CAG list. In such an example scenario, in the UE allowed CAG list, there is no PLMN1/PLMN2 related CAG ID, and the UE's NAS layer can select PLMN1+CAG ID 1 or PLMN1+CAG ID 2 to access the cell. In this example scenario, the UE's NAS layer may not select PLMN2+CAG ID3 or PLMN2+CAG ID4 to access the cell.

Figure 14A:
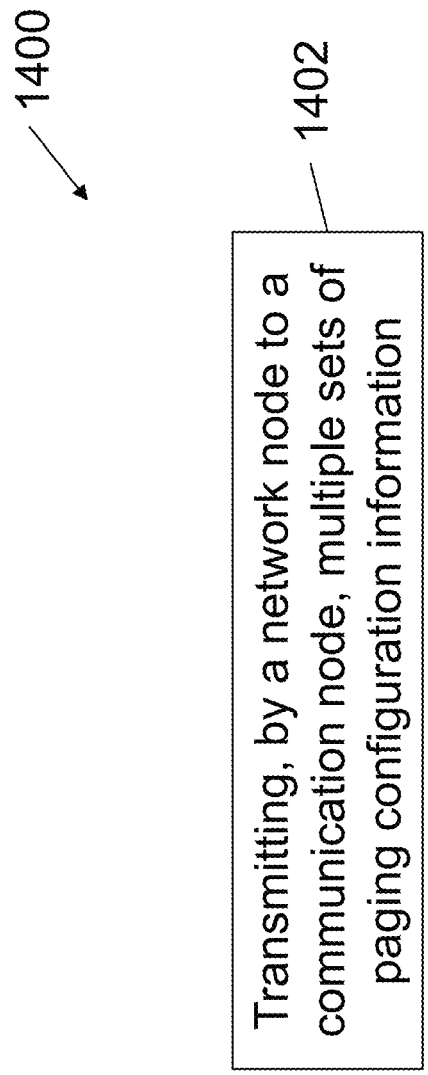
FIG. 14A shows an exemplary flowchart for transmitting multiple sets of paging configuration information.

FIG. 14A shows an exemplary flowchart 1400 for transmitting multiple sets of paging configuration information. At operation 1402, a network node (e.g., RAN node) transmits, to a communication node, multiple sets of paging configuration information, where each set of paging configuration information includes a service type information that describes a type of network service, and where each set of paging configuration information includes one or more paging related information. In some embodiments for method 1400, the service type information includes a Network Slice Selection Assistance Information (NSSAI). In some embodiments for method 1400, the one or more paging related information includes one or more paging control channel (PCCH) configurations. In some embodiments for method 1400, the multiple sets of paging configuration information are transmitted in a system information block (SIB) or a radio resource control (RRC) message. In some embodiments the method 1400 further includes receiving, by the network node from the communication node and prior to the transmitting, a first message that indicates that the communication node supports multiple paging configuration; and transmitting, to a core network and after receiving the first message, a second message that indicates that the communication node supports multiple paging configuration. In some embodiments for method 1400, each set of paging configuration information includes any one or more of search space, a CORESET, a bandwidth, a location on frequency domain, a transmitting method, a reference signal, a RNTI, and/or a sub-carrier spacing.

In some embodiments for method 1400, prior to the receiving the first message, the network node transmits, to the core network, a third message that indicates that the network node supports multiple paging configuration. In some embodiments for method 1400, the third message is transmitted by the network node during a next generation control plane interface (NG-C) or Si interface setup process. In some embodiments for method 1400, the second message includes a User Equipment (UE) Radio Paging Information message or a UE Radio Access Capability Information message.

Figure 14B:
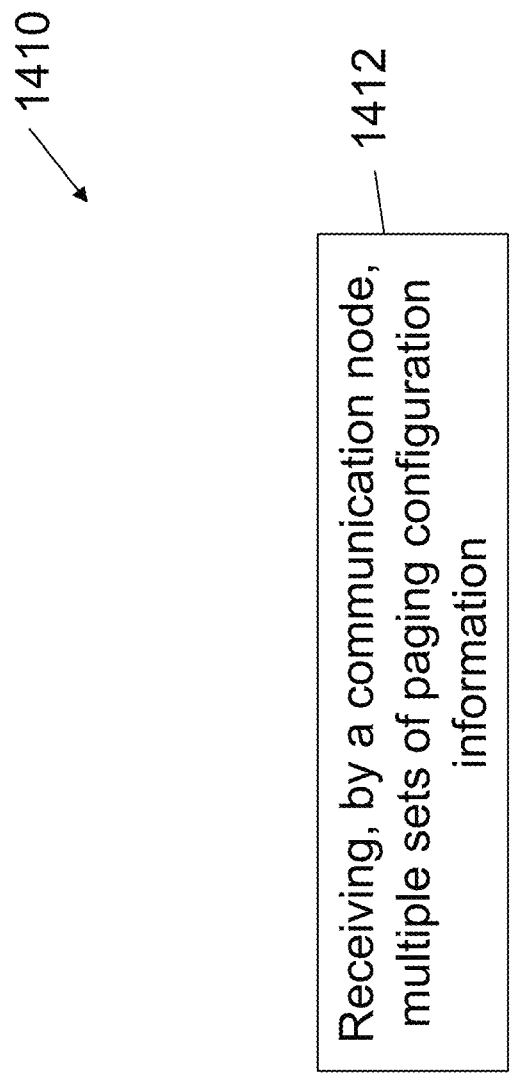
FIG. 14B shows an exemplary flowchart for transmitting multiple sets of paging configuration information.

FIG. 14B shows an exemplary flowchart 1410 for transmitting multiple sets of paging configuration information. At operation 1412, a communication node receives multiple sets of paging configuration information, where each set of paging configuration information includes a service type information that describes a type of network service, and where each set of paging configuration information includes one or more paging related information. In some embodiments for method 1410, the service type information includes a Network Slice Selection Assistance Information (NSSAI). In some embodiments for method 1410, the one or more paging related information includes one or more Paging Control Channel (PCCH) configurations. In some embodiments for method 1410, the multiple sets of paging configuration information are received in a System Information Block (SIB) or a Radio Resource Control (RRC) message. In some embodiments, the method 1410 further includes transmitting a message that indicates that the communication node supports multiple paging configuration. In some embodiments for one or more methods described in this patent document, each set of paging configuration information includes any one or more of search space, a CORESET, a bandwidth, a location on frequency domain, a transmitting method, a reference signal, a RNTI, and/or a sub-carrier spacing, etc., In some embodiments for method 1410, the message is transmitted to a network node, or the message is transmitted to a core network via a Non-Access Stratum (NAS) message. In some embodiments, the method 1410 further includes selecting, by the communication node, a set of paging configuration information from the multiple sets of paging configuration information. In some embodiments for method 1410, a same criterion for the selecting of the set of paging configuration is shared by the communication node and a core network. In some embodiments for method 1410, a Non-Access Stratum (NAS) layer of the communication node indicates one or more allowed slices indicated by one or more NSSAI to an Access Stratum (AS) layer of the communication node, the AS layer selects, from the one or more allowed slices, a Paging Control Channel (PCCH) configuration information associated with a NSSAI, and the AS layer detects paging based on the PCCH configuration information.

In some embodiments for method 1410, an Access Stratum (AS) layer of the communication node indicates at least two sets of paging configuration information to a Non-Access Stratum (NAS) layer of the communication node, the NAS layer selects, from the at least two sets of paging configuration information, a Paging Control Channel (PCCH) configuration information associated with one set of paging configuration information, the NAS layer indicates the selected PCCH configuration information to the AS layer, and the AS layer detects paging based on the selected PCCH configuration information.

Figure 14C:
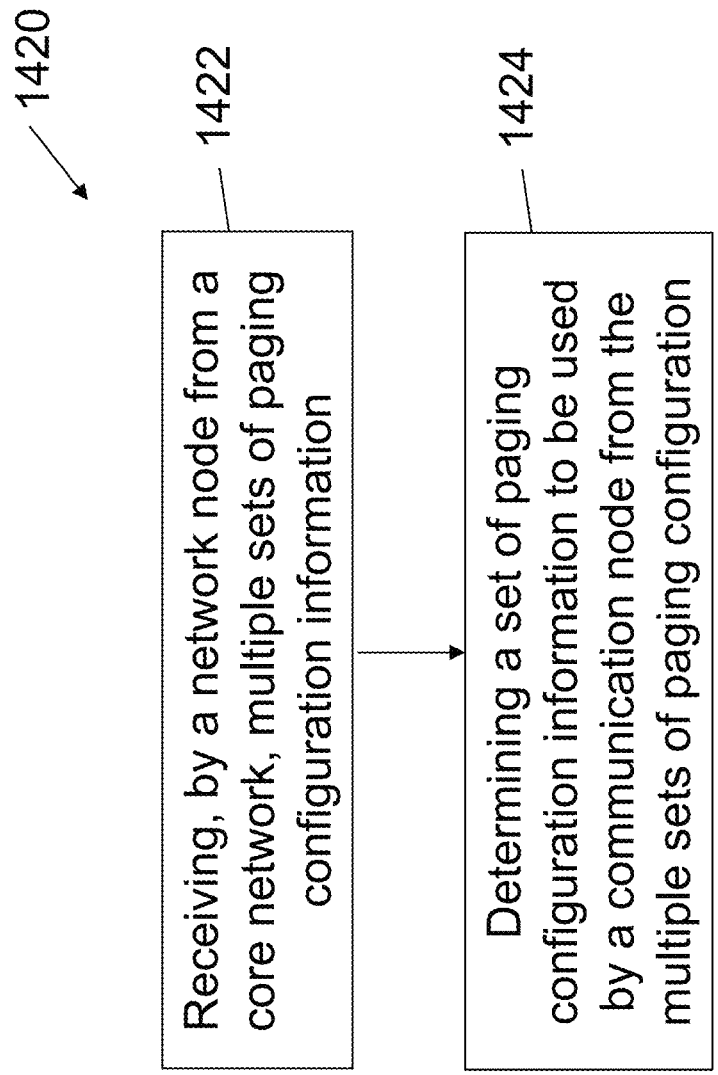
FIG. 14C shows a first exemplary flowchart for processing multiple sets of paging configuration information.

FIG. 14C shows a first exemplary flowchart 1420 for processing multiple sets of paging configuration information. At operation 1422, a network node receives, from a core network, multiple sets of paging configuration information, where each set of paging configuration information includes a service type information that describes a type of network service, and where each set of paging configuration information includes one or more paging related information. At operation 1424, the network node determines a set of paging configuration information to be used by a communication node from the multiple sets of paging configuration. In some embodiments for method 1420, the service type information includes a Network Slice Selection Assistance Information (NSSAI).

Figure 14D:
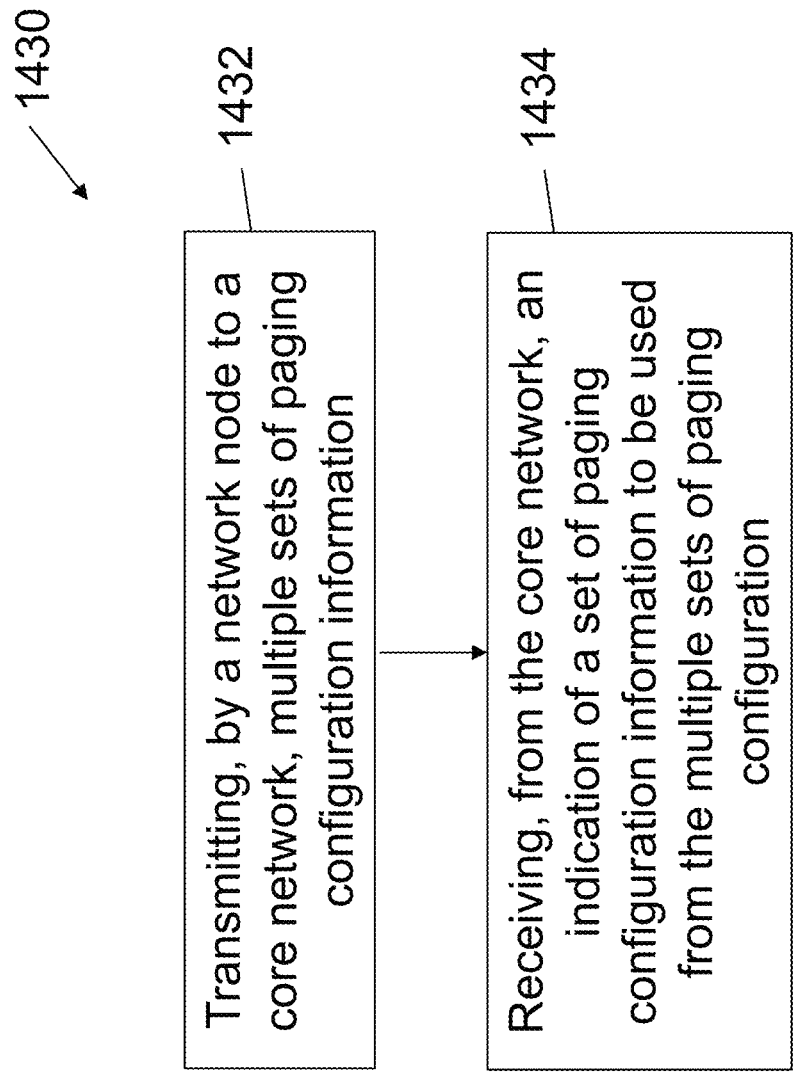
FIG. 14D shows a second exemplary flowchart for processing multiple sets of paging configuration information.

FIG. 14D shows a second exemplary flowchart 1430 for processing multiple sets of paging configuration information. At operation 1432, a network node transmits, to a core network, multiple sets of paging configuration information, where each set of paging configuration information includes a service type information that describes a type of network service, and where each set of paging configuration information includes one or more paging related information. At operation 1434, the network node receives, from the core network, an indication of a set of paging configuration information to be used from the multiple sets of paging configuration. In some embodiments for method 1430, the service type information includes a Network Slice Selection Assistance Information (NSSAI). In some embodiments for method 1430, the indication is received in an initial context setup response message or in a paging message. In some embodiments for method 1430, the indication includes a Paging Control Channel (PCCH) configuration index.

Figure 14E:
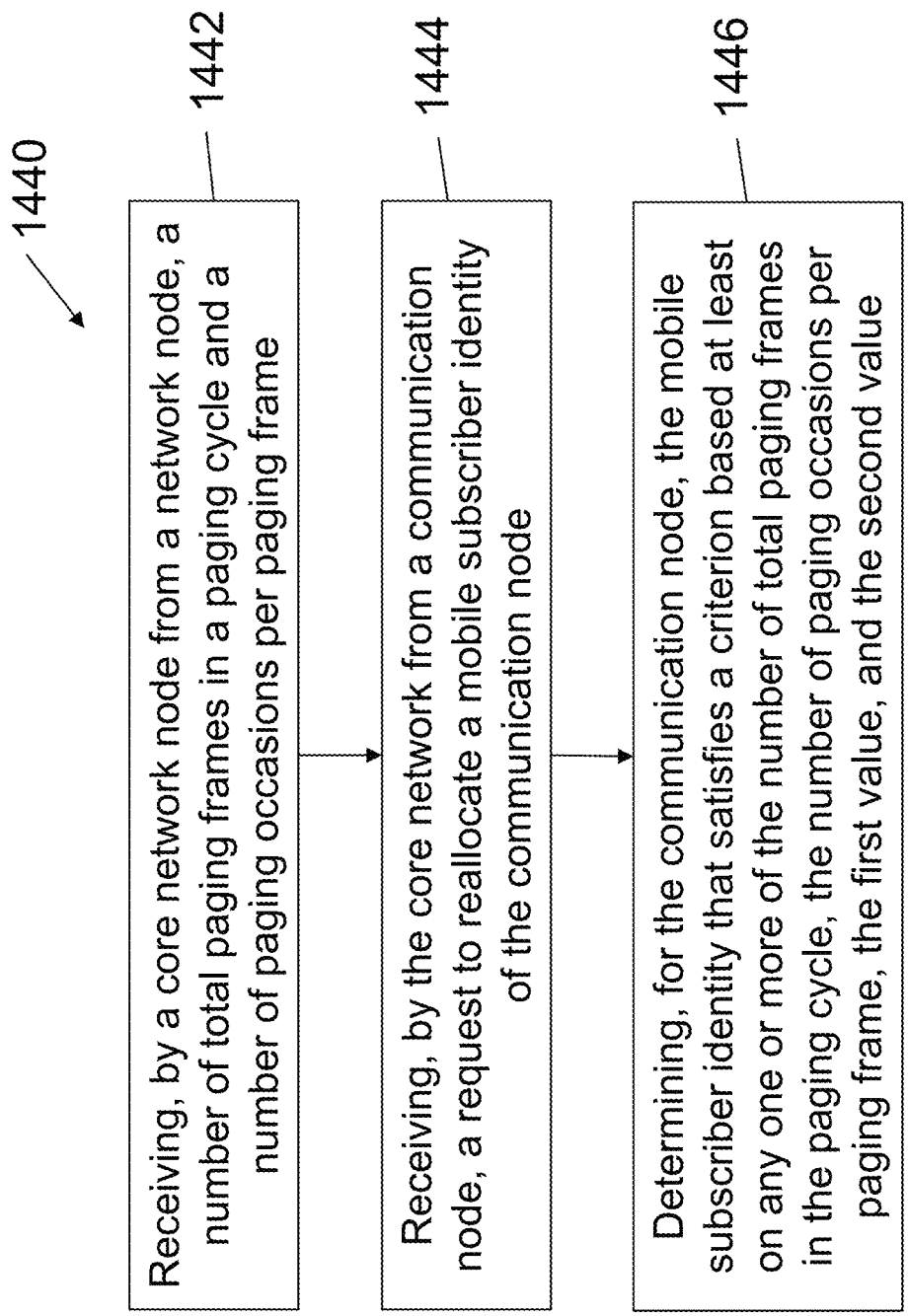
FIG. 14E shows an exemplary flowchart for determining a mobile subscriber identity.

FIG. 14E shows an exemplary flowchart 1440 for determining a mobile subscriber identity. At operation 1442, a core network receives, from a network node, a number of total paging frames in a paging cycle and a number of paging occasions per paging frame. At operation 1444, the core network receives from a communication node a request to reallocate a mobile subscriber identity of the communication node, where the request includes a reallocation assistance information that includes: a first value based on an identifier of the communication node and the number of total paging frames in the paging cycle, and a second value based on the identifier of the communication node, the number of total paging frames in the paging cycle, and the number of paging occasions per paging frame. At operation 1446, determining, for the communication node, the mobile subscriber identity that satisfies a criterion based at least on any one or more of the number of total paging frames in the paging cycle, the number of paging occasions per paging frame, the first value, and the second value.

In some embodiments for method 1440, the criterion for the determining excludes, for the mobile subscriber identity, the identifier of the communication node associated with the first value and the second value. In some embodiments for method 1440, the first value is equal to a remainder of a division operation in which the identifier of the communication node is divided by the number of total paging frames in the paging cycle. In some embodiments for method 1440, the second value is equal to a remainder of a first division operation in which a integer value is divided by the number of paging occasions per paging frame, and the integer value is a greatest integer value less than or equal to a value derived from a second division operation in which the identifier of the communication node is divided by the number of total paging frames in the paging cycle.

Figure 14F:
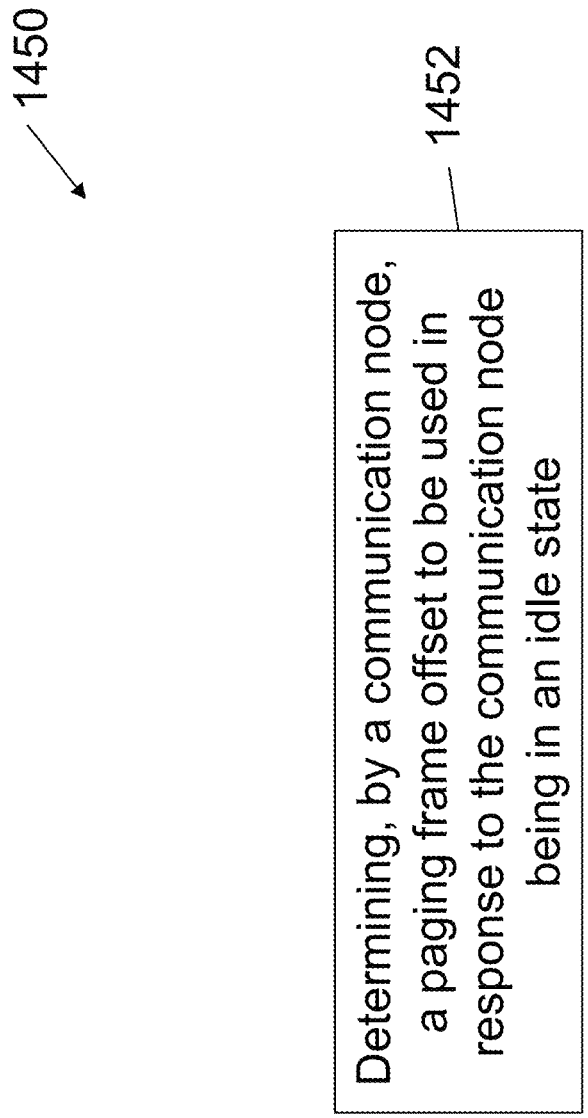
FIG. 14F shows a first exemplary flowchart for determining a paging offset.

FIG. 14F shows a first exemplary flowchart 1450 for determining a paging offset. At operation 1452, a communication node determines a paging frame offset to be used in response to the communication node being in an idle state, where the paging frame offset is based on a system frame number (SFN), a first paging cycle in the idle state (Tidle), and a pre-determined value, where a paging message is received according to the paging frame offset in response to the communication node in an inactive state having a second paging cycle that is same as the first paging cycle of the communication node in the idle state. In some embodiments for method 1450, the paging frame offset is equal to a remainder of a first division operation in which a first value is divided by the pre-determined value, and the first value is a result of a second division operation in which the SFN is divided by the Tidle.

Figure 14G:
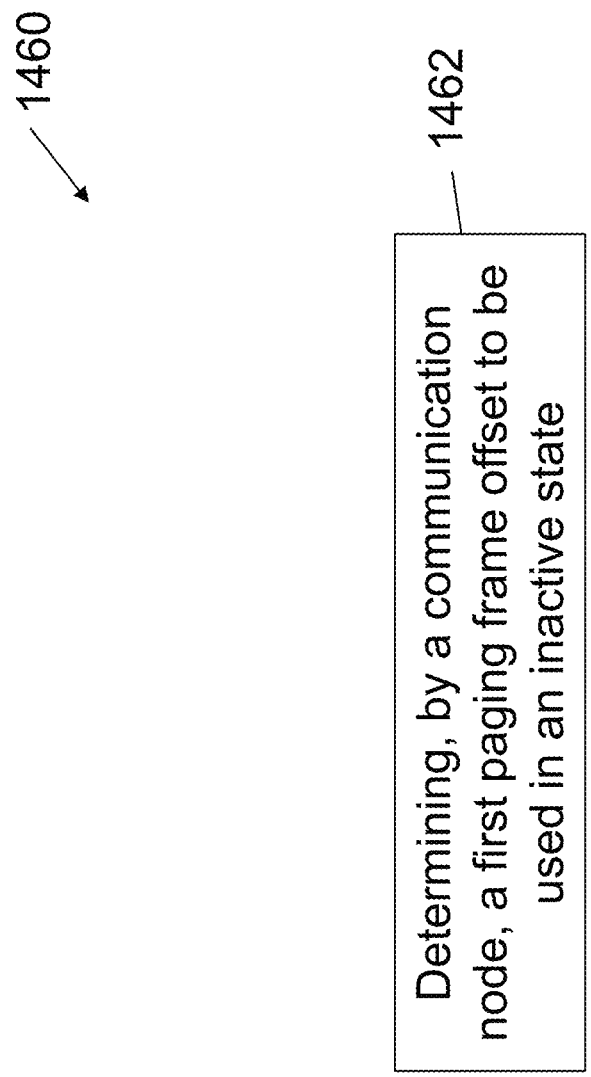
FIG. 14G shows a second exemplary flowchart for determining a paging offset.

FIG. 14G shows a second exemplary flowchart 1460 for determining a paging offset. At operation 1462, a communication node determines a first paging frame offset to be used in an inactive state, where the first paging frame offset is based at least on a system frame number (SFN), a paging cycle in the inactive state (Tinactive), a first pre-determined value, and a second pre-determined value, and where a paging message is received according to the first paging frame offset in response to the communication node being in the inactive state. In some embodiments for method 1460, the first paging frame offset is equal to a remainder of a first division operation in which a first value is divided by the second pre-determined value, the first value is based at least on a reminder of a second division operation in which a third value is divided by the first pre-determined value, and the third value is the SFN divided by the Tinactive. In some embodiments, the first value is a result of a second paging frame offset added to the reminder of the second division operation in which the third value is divided by the first pre-determined value, where the second paging frame offset for the communication node in an idle state.

FIG. 14H shows an exemplary flowchart 1470 for transmitting a selection capability indication for selection of an NPN. At operation 1472, a network node transmits, to a communication node, cell access related information that includes a selection capability indication configured to indicate whether the communication node is enabled to select a NPN that the communication node is not authorized to select automatically. In some embodiments, the communication node is not authorized to automatically select an NPN that is excluded from an allowed cell access list. In some embodiments for method 1470, the selection capability indication configured to indicate whether the communication node is enabled to select the NPN comprises the selection capability indication configured to indicate whether the communication node is enabled to perform a manual selection of the NPN. In some embodiments for method 1470, the selection capability indication is associated with each of the one or more Public Land Mobile Networks (PLMNs) in the cell access related information. In some embodiments for method 1470, the selection capability indication is associated with each of one or more Cell Access Group (CAG) identifiers (IDs) in the cell access related information. In some embodiments for method 1470, the selection capability indication is included in a System Information Block (SIB).

Figure 14I:
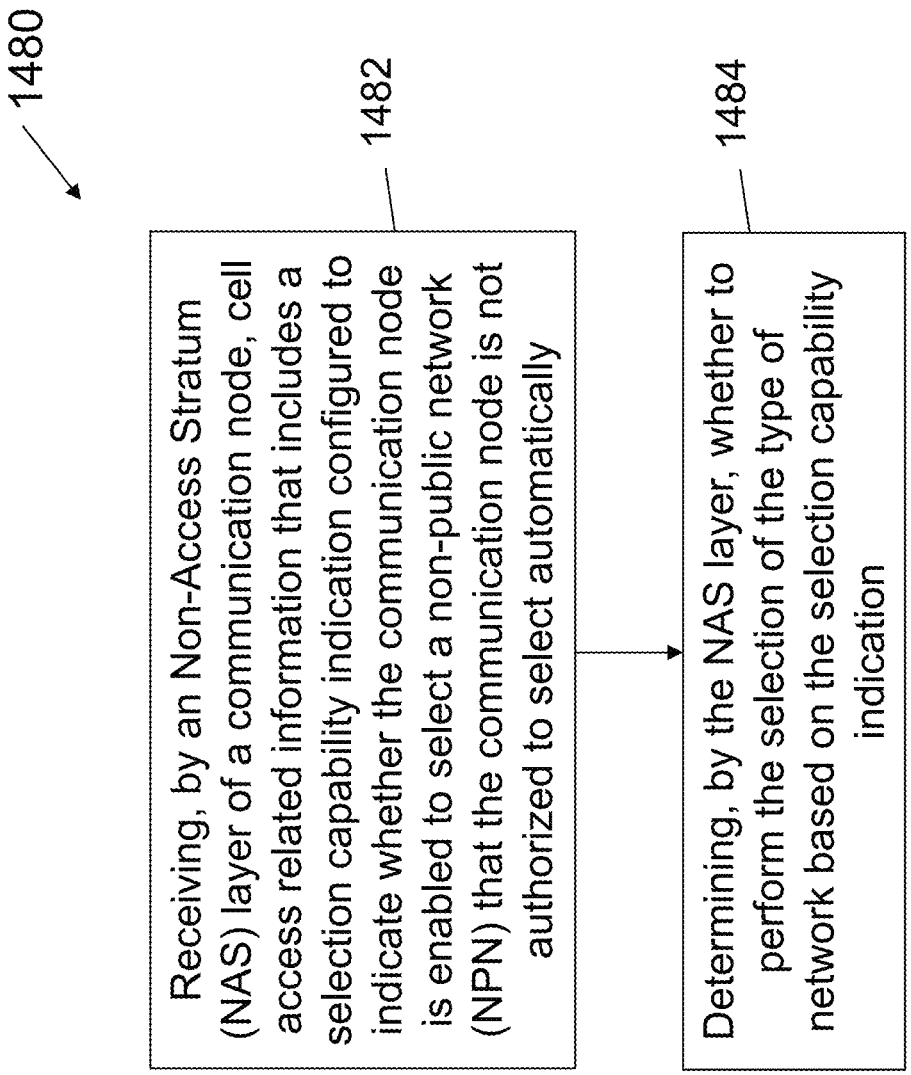
FIG. 14I shows an exemplary flowchart for processing a selection capability indication for selection of an NPN.

FIG. 14I shows an exemplary flowchart 1480 for processing a selection capability indication for selection of an NPN. At operation 1482, a Non-Access Stratum (NAS) layer of a communication node receives cell access related information that includes a selection capability indication configured to indicate whether the communication node is enabled to select a non-public network (NPN) that the communication node is not authorized to select automatically. In some embodiments, the communication node is not authorized to automatically select an NPN that is excluded from an allowed cell access list. At operation 1484, the NAS layer determines whether to perform the selection of the type of network based on the selection capability indication. In some embodiments for method 1480, the selection capability indication configured to indicate whether the communication node is enabled to select the NPN comprises the selection capability indication configured to indicate whether the communication node is enabled to perform a manual selection of the NPN. In some embodiments for method 1480, the selection capability indication is associated with each of the one or more Public Land Mobile Networks (PLMNs) in the cell access related information. In some embodiments for method 1480, the selection capability indication is associated with each of one or more Cell Access Group (CAG) identifiers (IDs) in the cell access related information. In some embodiments for method 1480, the selection capability indication is included in a System Information Block (SIB).

Figure 15:
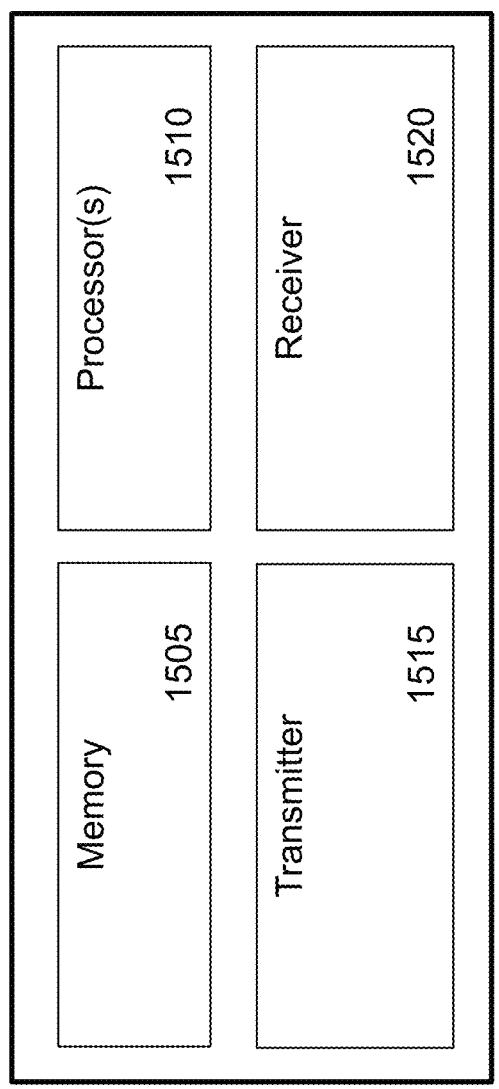
FIG. 15 shows an exemplary block diagram of a hardware platform that may be a part of a network node, core network, or a user equipment.

FIG. 15 shows an exemplary block diagram of a hardware platform 1500 that may be a part of a network node, core network, or a user equipment. The hardware platform 1500 includes at least one processor 1510 and a memory 1505 having instructions stored thereupon. The instructions upon execution by the processor 1510 configure the hardware platform 1500 to perform the operations described in FIGS. 1 to 14I and in the various embodiments described in this patent document. The transmitter 1515 transmits or sends information or data to another node. For example, a network node transmitter can send a SIB comprising multiple paging configuration to a user equipment. The receiver 1520 receives information or data transmitted or sent by another node. For example, a user equipment can receive a message from a core network.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple

What is claimed is:

1. A wireless communication method, comprising:
   transmitting, by a network node to a communication node, multiple sets of paging configuration information,
   wherein each set of paging configuration information includes a service type information that describes a type of network service, and
   wherein each set of paging configuration information includes one or more paging related information;
   receiving, by the network node from the communication node and prior to the transmitting, a first message that indicates that the communication node supports multiple paging configuration; and
   transmitting, to a core network and after receiving the first message, a second message that indicates that the communication node supports multiple paging configuration,
   wherein an Access Stratum (AS) layer of the communication node indicates at least two sets of paging configuration information to a Non-Access Stratum (NAS) layer of the communication node,
   wherein the NAS layer selects, from the at least two sets of paging configuration information, a Paging Control Channel (PCCH) configuration information associated with one set of paging configuration information,
   wherein the NAS layer indicates the selected PCCH configuration information to the AS layer, and
   wherein the AS layer detects paging based on the selected PCCH configuration information.

2. The method of claim 1, wherein the service type information includes a Network Slice Selection Assistance Information (NSSAI).

3. The method of claim 1, wherein the one or more paging related information includes one or more paging control channel (PCCH) configurations.

4. The method of claim 1, wherein the multiple sets of paging configuration information are transmitted in a system information block (SIB) or a radio resource control (RRC) message.

5. The method of claim 1, wherein prior to the receiving the first message, the network node transmits, to the core network, a third message that indicates that the network node supports multiple paging configuration.

6. The method of claim 1, wherein a same criterion for selecting of a set of paging configuration from the multiple sets of paging configuration information is shared by the communication node and the core network.

7. The method of claim 1,
   wherein the NAS layer of the communication node indicates one or more allowed slices indicated by one or more Network Slice Selection Assistance Information (NSSAI) to an Access Stratum (AS) layer of the communication node,
   wherein the AS layer selects, from the one or more allowed slices, a Paging Control Channel (PCCH) configuration information associated with a NSSAI, and
   wherein the AS layer detects paging based on the PCCH configuration information.

8. A network node for wireless communication, comprising:
   a processor configured to implement a method, the processor configured to:
   transmit, to a communication node, multiple sets of paging configuration information,
   wherein each set of paging configuration information includes a service type information that describes a type of network service, and
   wherein each set of paging configuration information includes one or more paging related information;
   receive, from the communication node and prior to the transmitting, a first message that indicates that the communication node supports multiple paging configuration; and
   transmit, to a core network and after the first message is received, a second message that indicates that the communication node supports multiple paging configuration,
   wherein an Access Stratum (AS) layer of the communication node indicates at least two sets of paging configuration information to a Non-Access Stratum (NAS) layer of the communication node,
   wherein the NAS layer selects, from the at least two sets of paging configuration information, a Paging Control Channel (PCCH) configuration information associated with one set of paging configuration information,
   wherein the NAS layer indicates the selected PCCH configuration information to the AS layer, and
   wherein the AS layer detects paging based on the selected PCCH configuration information.

9. The network node of claim 8, wherein the service type information includes a Network Slice Selection Assistance Information (NSSAI).

10. The network node of claim 8, wherein the one or more paging related information includes one or more paging control channel (PCCH) configurations.

11. The network node of claim 8, wherein the multiple sets of paging configuration information are transmitted in a system information block (SIB) or a radio resource control (RRC) message.

12. The network node of claim 8, wherein a same criterion for a selection of a set of paging configuration from the multiple sets of paging configuration information is shared by the communication node and the core network.

13. The network node of claim 8,
   wherein the NAS layer of the communication node indicates one or more allowed slices indicated by one or more Network Slice Selection Assistance Information (NSSAI) to an Access Stratum (AS) layer of the communication node,
   wherein the AS layer selects, from the one or more allowed slices, a Paging Control Channel (PCCH) configuration information associated with a NSSAI, and
   wherein the AS layer detects paging based on the PCCH configuration information.

14. The network node of claim 8, wherein prior to the first message being received, the network node is configured to transmit, to the core network, a third message that indicates that the network node supports multiple paging configuration.

* * * * *